US012704381B2

(12) United States Patent
Baglino et al.

(10) Patent No.: US 12,704,381 B2
(45) Date of Patent: Aug. 11, 2026

(54) TRIP PLANNING WITH ENERGY CONSTRAINT

(71) Applicant: Tesla, Inc., Austin, TX (US)

(72) Inventors: Andrew D. Baglino, San Francisco, CA (US); Thorsten Hayer, Burlingame, CA (US); Brennan Boblett, San Francisco, CA (US); Matthew Fox, Woody Creek, CO (US); Vineet H. Mehta, Mountain View, CA (US); Keijiro Ikebe, Cupertino, CA (US); Kevin Hsieh, Emerald Hills, CA (US); Craig B. Carlson, Los Altos, CA (US); Jeffrey B. Straubel, Menlo Park, CA (US)

(73) Assignee: Tesla, Inc., Austin, TX (US)

( * ) Notice: Subject to any disclaimer, the term of this patent is extended or adjusted under 35 U.S.C. 154(b) by 123 days.

(21) Appl. No.: 18/352,597

(22) Filed: Jul. 14, 2023

(65) Prior Publication Data

US 2024/0085203 A1 Mar. 14, 2024

Related U.S. Application Data

(63) Continuation of application No. 16/408,651, filed on May 10, 2019, now Pat. No. 11,703,340, which is a continuation of application No. 15/301,738, filed as application No. PCT/US2015/021556 on Mar. 19, 2015, now Pat. No. 10,295,355.

(60) Provisional application No. 61/975,534, filed on Apr. 4, 2014.

(51) Int. Cl.
*G01C 21/34* (2006.01)
*G01C 21/36* (2006.01)

(52) U.S. Cl.
CPC ..... *G01C 21/3469* (2013.01); *G01C 21/3697* (2013.01); *Y02T 10/72* (2013.01)

(58) Field of Classification Search
None
See application file for complete search history.

(56) References Cited

U.S. PATENT DOCUMENTS 8,612,082 B2 12/2013 Hashimoto
9,266,443 B2 * 2/2016 Payne .................... B60L 58/12
10,295,355 B2 5/2019 Baglino et al.
11,703,340 B2 7/2023 Baglino et al.
(Continued)

*Primary Examiner* — Ramon A. Mercado
*Assistant Examiner* — David Ruben Pedersen
(74) *Attorney, Agent, or Firm* — Knobbe, Martens, Olson & Bear, LLP

(57) ABSTRACT

A method includes: determining, based, at least in part, on a predicted driver characteristic, a first energy-versus-distance measure for a planned driving route of a vehicle, the first energy-versus-distance measure determined using an energy model; presenting the first energy-versus-distance measure on a user interface associated with the vehicle; identifying an already-driven part of the planned driving route; determining, based on information associated with the already-driven part of the planned driving route, a model error associated with the energy model; determining a second energy-versus-distance measure by modifying the first energy-versus-distance measure to account for the model error; and presenting the second energy-versus-distance measure on the user interface associated with the vehicle.

15 Claims, 26 Drawing Sheets

(56) References Cited

U.S. PATENT DOCUMENTS

2003/0006914 A1 1/2003 Todoriki et al.
2004/0230376 A1 11/2004 Ichikawa
2008/0319596 A1* 12/2008 Yamada .................. B60L 50/61 903/930
2009/0005929 A1 1/2009 Nakao
2010/0106401 A1 4/2010 Naito et al.
2010/0138142 A1* 6/2010 Pease ................ B60W 50/0097 701/123
2011/0077854 A1 3/2011 Fushiki et al.
2011/0184600 A1 7/2011 Kristinsson et al.
2011/0238287 A1 9/2011 Hayashi
2011/0238457 A1 9/2011 Mason
2011/0241905 A1 10/2011 Niwa
2011/0307166 A1 12/2011 Hiestermann
2012/0194346 A1 8/2012 Tsai et al.
2012/0232730 A1 9/2012 Sujan
2012/0316714 A1 12/2012 Nagayanagi et al.
2013/0046466 A1 2/2013 Yucel et al.
2013/0073113 A1 3/2013 Wang et al.
2013/0131892 A1 5/2013 Hashimoto
2013/0158741 A1 6/2013 Hahne
2013/0261914 A1 10/2013 Ingram et al.
2014/0046585 A1 2/2014 Morris et al.
2014/0046595 A1 2/2014 Segawa
2014/0236403 A1 8/2014 Liu
2014/0278038 A1* 9/2014 Stankoulov ........... G06T 11/203 701/123
2014/0303826 A1* 10/2014 Kobayashi ............. B60L 58/10 701/22
2015/0039391 A1* 2/2015 Hershkovitz ........ G01R 31/382 705/7.31
2015/0112526 A1 4/2015 Martin
2015/0345972 A1 12/2015 Saito
2016/0001671 A1 1/2016 Mori
2016/0003621 A1* 1/2016 Koenig .................. B60K 35/28
2016/0061610 A1 3/2016 Meyer

* cited by examiner

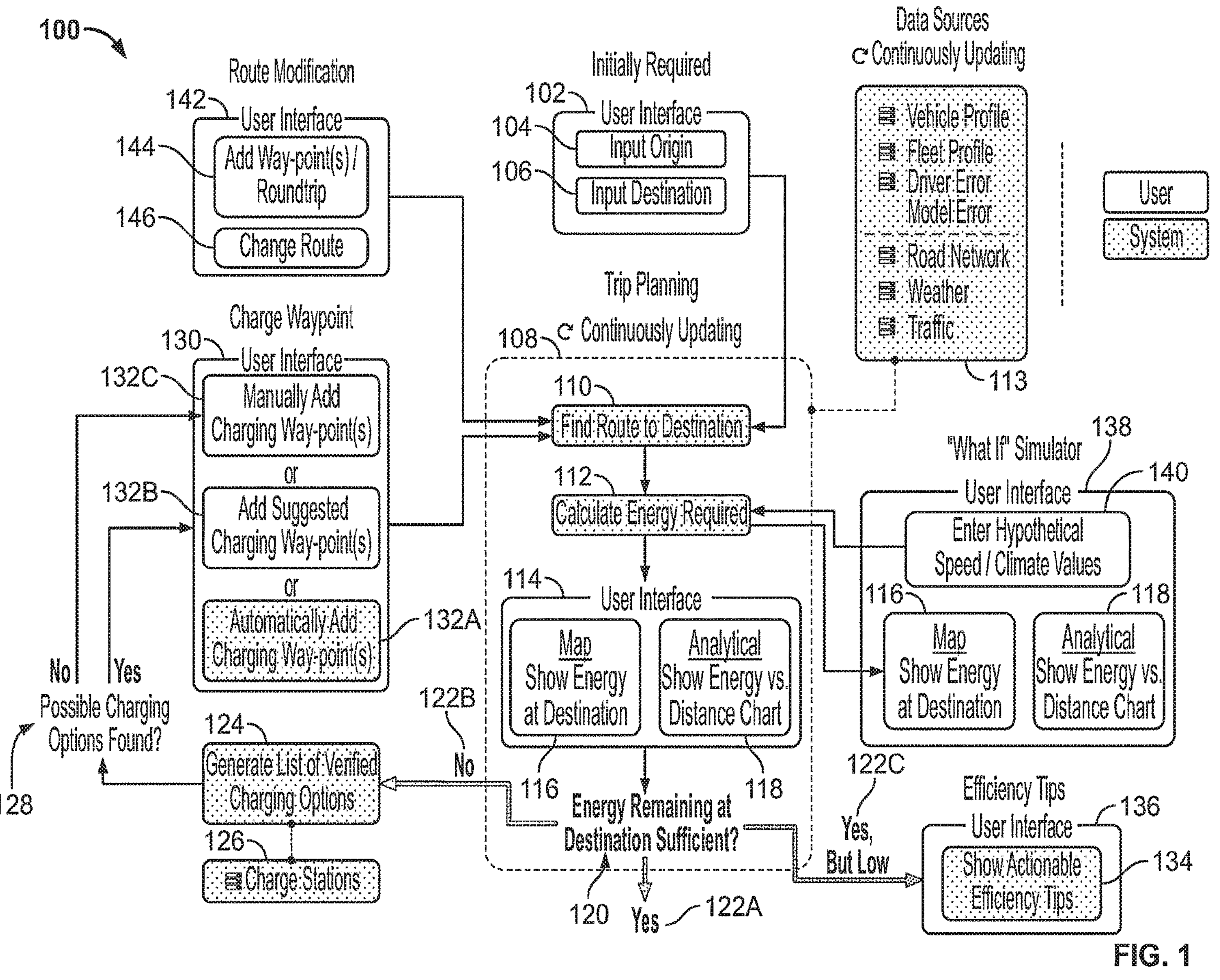
100
Route Modification
142
User Interface
144
Add Way-point(s) / Roundtrip
146
Change Route
Initially Required
102
User Interface
104
Input Origin
106
Input Destination
Data Sources
Continuously Updating
Vehicle Profile
Fleet Profile
Driver Error
Model Error
Road Network
Weather
Traffic
113
User
System
Trip Planning
108
Continuously Updating
110
Find Route to Destination
112
Calculate Energy Required
114
User Interface
Map
Show Energy at Destination
Analytical
Show Energy vs. Distance Chart
116
118
Energy Remaining at Destination Sufficient?
120
Yes
122A
No
122B
Yes, But Low
122C
"What If" Simulator
138
User Interface
140
Enter Hypothetical Speed / Climate Values
116
Map
Show Energy at Destination
118
Analytical
Show Energy vs. Distance Chart
Efficiency Tips
User Interface
136
Show Actionable Efficiency Tips
134
Charge Waypoint
130
User Interface
132C
Manually Add Charging Way-point(s)
or
132B
Add Suggested Charging Way-point(s)
or
Automatically Add Charging Way-point(s)
132A
No
Yes
Possible Charging Options Found?
128
124
Generate List of Verified Charging Options
126
Charge Stations
FIG. 1

TRIP PLANNING WITH ENERGY CONSTRAINT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Many vehicles have navigation features. Typically these are based on wireless technology (e.g., GPS) and they allow the driver to see the vehicle's location on a displayed map in real time, and may also offer functionality for planning a trip to one or more destinations.

Whatever the type of engine that propels the vehicle, energy must be replenished from time to time in order to continue driving. For example, some vehicles rely on an all-electric drivetrain that is powered by energy stored in a battery, while other vehicles use a hybrid engine or even a combustion engine dependent on burning fossil fuel. Common to all types of vehicles is that the driver has an interest in monitoring the status of remaining energy in the vehicle, and in knowing how the level of available energy affects the remainder of the intended driving distance (e.g., the rest of the trip).

SUMMARY

In a first aspect, a method includes: receiving information corresponding at least to (i) a state of charge of an energy storage of a vehicle, (ii) route information corresponding to a planned driving route for the vehicle, and (iii) a predicted driver characteristic; determining using the received information, and presenting to a driver of the vehicle, a first energy-versus-distance measure for the planned driving route; receiving a user input indicating a proposed change in at least the driver characteristics, and determining using the received information and the user input, and presenting to the driver, a second energy-versus-distance measure for the planned driving route that takes into account the proposed change.

Implementations can include any or all of the following features. The predicted driver characteristic includes an estimated driving speed, and wherein the proposed change modifies the estimated driving speed. The predicted driver characteristic reflects a driving record of the driver. The predicted driver characteristic reflects driving records from a fleet of vehicles. The information further reflects an estimated climate system usage, and wherein the proposed change modifies the estimated climate system usage. The information further reflects an estimated vehicle closure setting, and wherein the proposed change modifies the estimated vehicle closure setting. Presenting the first and second energy-versus-distance measures comprises presenting a graph of remaining energy in the energy storage as a function of distance. The method further includes providing in the graph, at an endpoint of the planned driving route, respective representations of state-of-charge percentages corresponding to the first and second energy-versus-distance measures. The user input is received after the vehicle has been driven for part of the planned driving route, further comprising determining a state-of-charge percentage for the endpoint based on the driven part of the planned driving route, and providing a representation of the determined state-of-charge percentage in the graph. The planned driving route comprises a starting point and an ending point, the method further comprising adding a charging waypoint to the planned driving route, the charging waypoint corresponding to a charging location for the electric vehicle, wherein a current energy-versus-distance measure is recalculated based on adding the charging waypoint. The charging waypoint is automatically added in response to a state of charge of the energy storage. The method further includes presenting to the driver alternative charging waypoints in response to a state of charge of the energy storage, wherein the charging waypoint is added to the planned driving route based on a selection by the driver. The driver enters information specifying the charging location, and wherein the charging waypoint is created and added to the planned driving route using the entered information. The first energy-versus-distance measure is based on historical information; after the vehicle has been driven for part of the planned driving route, a third energy-versus-distance measure is determined based on the driven part of the planned driving route, the third energy-versus-distance measure modifying the first energy-versus-distance measure using a model error and a driver error; and in response to the user input, the second energy-versus-distance measure is determined by modifying the first energy-versus-distance measure using the proposed change and the model error, but not the driver error.

In a second aspect, a computer readable storage medium has stored thereon instructions that when executed cause a processor to perform operations includes: receiving information corresponding at least to (i) a state of charge of an energy storage of a vehicle, (ii) route information corresponding to a planned driving route for the vehicle, and (iii) a predicted driver characteristic; determining using the received information, and presenting to a driver of the vehicle, a first energy-versus-distance measure for the planned driving route; receiving a user input indicating a proposed change in at least the driver characteristics, and determining using the received information and the user input, and presenting to the driver, a second energy-versus-distance measure for the planned driving route that takes into account the proposed change.

In a third aspect, a computer readable storage medium has stored thereon instructions that when executed cause a processor to generate a graphical user interface comprising: an area presenting a first energy-versus-distance measure for a planned driving route for a vehicle, the first energy-versus-distance measure determined using received information comprising at least (i) a state of charge of an energy storage of the electric vehicle, (ii) route information corresponding to the electric vehicle, and (iii) a predicted driver characteristic; and an input control for generating a user input that indicates a proposed change in at least the driver characteristics; wherein a second energy-versus-distance measure for the planned driving route is determined using the received information and the user input and presented in the area, the second energy-versus-distance measure taking into account the proposed change.

BRIEF DESCRIPTION OF DRAWINGS

FIG. 1 schematically shows a system that performs vehicle navigation using energy constraints.

DETAILED DESCRIPTION

Figure 2A:
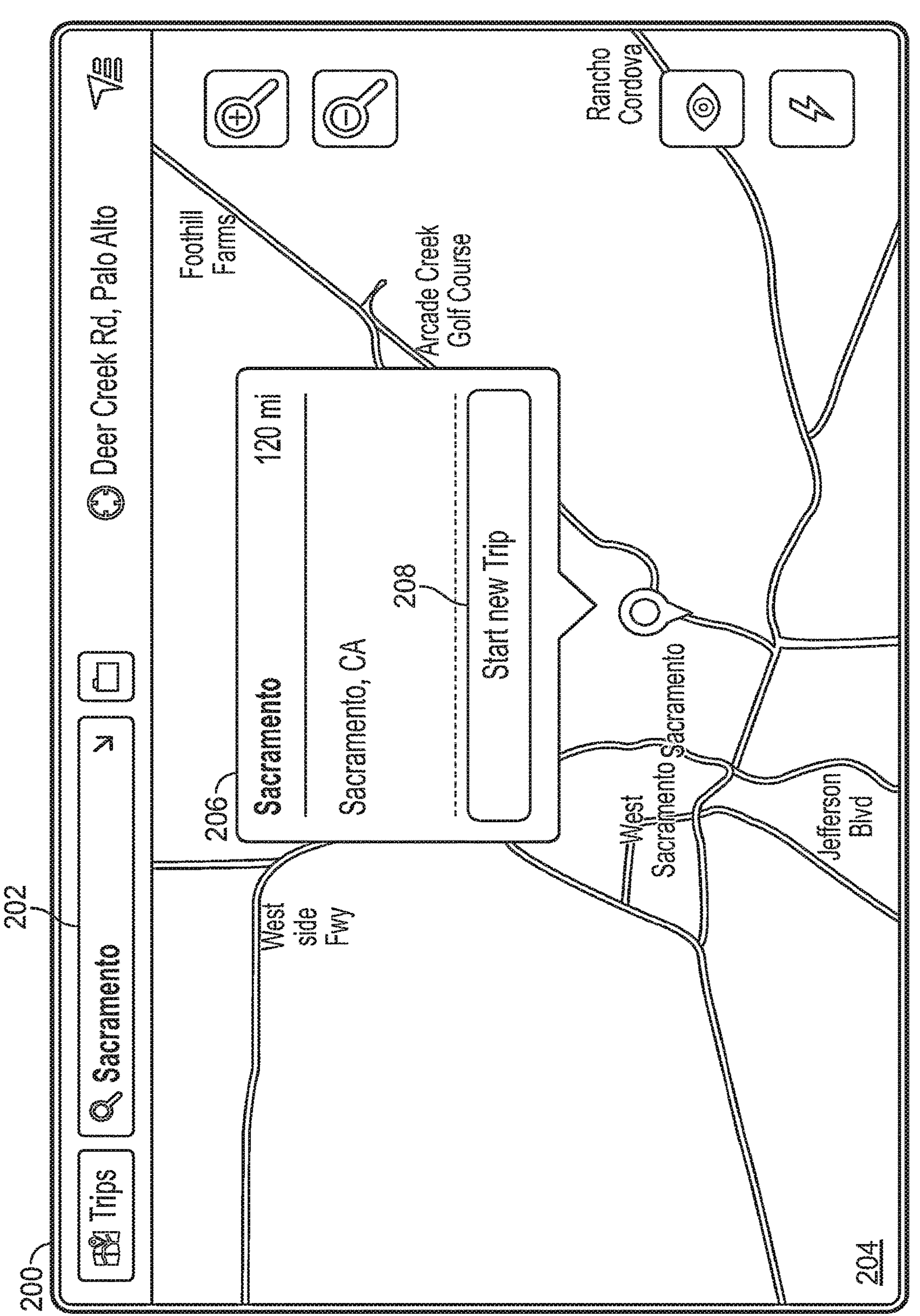
FIGS. 2A-C show an example where it is determined that a vehicle has enough energy to reach a planned destination.

This document describes systems and techniques for providing trip planning that presents one or more energy-versus-distance measures to the user. In some implementations, the system can, at the outset of a planned vehicle trip, present a measure that indicates how much energy (e.g., battery charge in an electric vehicle or fuel in an internal-combustion engine vehicle) will remain at the end of the planned trip. At any point during the trip, the energy actually remaining in the vehicle can differ from the predicted amount, depending on one or more errors in the prediction. The system can then provide a way for the driver to evaluate how the energy consumption (illustrated by the one or more energy-versus-distance measures) would change if the driver changes his or her driving behavior (e.g., driving style) for the rest of the trip.

In some implementations, an accumulated error in predicting energy consumption due to one or more sources is referred to as a "model error", because it relates to the underlying energy model used in the prediction. The entire trip can be logically composed of a number of computer-based road segments. After the vehicle has driven one or more of the segments, a hindsight energy consumption for the trip so far can then be calculated. In a sense, the hindsight energy calculation represents the energy consumption that would have been predicted at the outset of the trip had the driver's actual speed on the traversed segment(s) been known. The hindsight energy is summed over the number of segments traversed. The model error then is calculated by first subtracting the entire hindsight energy consumption from the actual energy consumed, and then dividing the difference by the hindsight energy consumption.

A driver error, in contrast, can be defined as an accumulated error that results from the driver's behavior differing from the predicted driver behavior. This can involve the speed at which the driver travels, or whether the driver activates climate control or other functionality that uses power, to name just a few examples. The driver error can be calculated by first subtracting the predicted energy use over the segment(s) from the hindsight energy consumption, and then dividing the difference by the hindsight energy consumption. That is, the predicted energy is here the estimation that was made using the predicted-not actual-speed over the one or more traversed segments.

The model error and driver error affect energy-versus-distance measures that are presented to the user, and will be exemplified later in this document.

FIG. 1 schematically shows a system 100 that performs vehicle navigation using energy constraints. In a user interface 102, a user inputs an origin 104 and a destination 106. In some implementations, the origin can be automatically input (e.g., based on current GPS data). This information is provided to a trip planning component 108 in the system. For example, the trip planning component can be implemented as one or more software modules. The trip planning component 108 performs a route-finding operation 110. The route from the specified origin to the specified destination is determined. Based on the determined route, vehicle specifics and information about the road segment(s) to be traveled, the system performs an energy calculation operation 112. The energy calculation determines how much energy is required for the vehicle to travel to the destination (e.g., how many kilowatt-hours of electric charge, or how much fuel).

The operation 110 can use one or more navigational tools, and the energy calculation operation 112 can use one or more road load equations. Both operations can take into account one or more types of data from a data source 113. Examples of data types include, but are not limited to, a vehicle profile (e.g., the type and model of the vehicle, including any optional equipment), a fleet profile (e.g., data collected from a fleet of vehicles, such as average battery consumption data or driver behavior), a driver error and a model error (e.g., as will be described below), road network data (e.g., length, slope and surface type for road segments), weather data (e.g., localized information regarding wind or precipitation) and traffic data. Some of the data source information can be continuously updated, for example to take into account current weather and traffic information, or to adjust the driver error for the current driver.

Output from the energy calculation can be used in updating a user interface 114 in the system. In some implementations, a map interface 116 can be updated, for example to show the predicted amount of energy remaining at the destination. In some implementations, an analytical interface 118 can be updated, for example to show an energy-versus-distance chart. Either or both of these interfaces can present energy-versus-distance measures that illustrate how much energy is left in the vehicle in a helpful way. Examples of the interfaces are described below.

The energy calculation operation 112 determines the answer to a branching inquiry 120, which in this example reads: Is the energy remaining at the destination sufficient? That is, the energy calculation either shows that the vehicle currently has enough energy to reach the end of the trip, or else the vehicle must be recharged or refueled during the way. In this example, the possible outcomes to the inquiry 120 are yes (122A), no (122B) and yes, but with low energy level (122C). If the answer is yes 122A, then the trip planning component can essentially remain idle until a new calculation should be performed. For example, the energy calculation can be repeated at regular intervals so that new data from the data sources 113 (if any) can be taken into account.

If the answer is no 122B, then the system can perform an operation 124 in which a list of one or more verified charging options is generated. This takes into account the planned route for the vehicle and can utilize a source 126 of charge stations. For example, the charge stations can provide battery recharging, battery exchange, and/or fuel refilling. Based on the generated list, the system performs a branching query 128 to determine whether one or more possible charging options have been found. The outcome of such determination can trigger one or more operations in a user interface 130. In some implementations, the system can automatically add one or more charging waypoints to the planned route (132A), the system can suggest one or more charging waypoints for user selection (132B), or the user can manually add one or more charging waypoints that were not known to the system (e.g., non-public charging equipment). For example, after a no answer in the operation 124 only the option 132C may be available to the user, whereas after a yes all three of the options 132A-C can be used. After any of the options 132A-C, the operation 110 in the trip planning component 108 can again be performed to find the correct route that incorporates the waypoint(s) and to update the energy calculation.

If the outcome to the inquiry 120 is yes, but with low energy level (122C), then the system can present actionable efficiency tips 134 in a user interface 136. For example, the system can recommend that the vehicle be driven more efficiently (such as at lower speed or with less acceleration), that the driver turn off features that consume electric power (e.g., a climate control system) or that the driver close the sunroof or another vehicle closure (which can improve aerodynamics).

At one or more points before or during the trip, the driver can perform a “what if” simulation in a user interface 138. The “what if” simulation allows the driver to explore how the vehicle’s energy consumption is affected by certain driving styles, or the use of climate control, to name just a few examples. In some implementations, the driver can make an input 140, for example by entering hypothetical speed and/or climate-control values, and the system can simulate the energy consumption while taking into account such constraint(s). For example, the outcome of the “what if” scenario can be presented in the map 116 (e.g., by labeling route segments according to the predicted remaining energy) or in the analytical interface 118 (e.g., by showing the predicted remaining energy as a function of traveled distance).

The driver can modify the route with a user interface 142. For example, a modification 144 can involve adding one or more waypoints to the route, or making the planned route a roundtrip. As another example, a change 146 can involve altering the route in one or more regards (such as to incorporate a detour by way of a scenic area).

The user interfaces 102, 114, 130, 138 and 142 can be generated on one or more display devices. In some implementations, the vehicle has a native display screen that is configured for use in controlling vehicle settings (e.g., a touchscreen), and such display can be used for any of the interactions described herein. As another example, the interfaces can be incorporated in one or more mobile devices or other portable equipment (e.g., a smartphone or a GPS device).

Figure 2B:
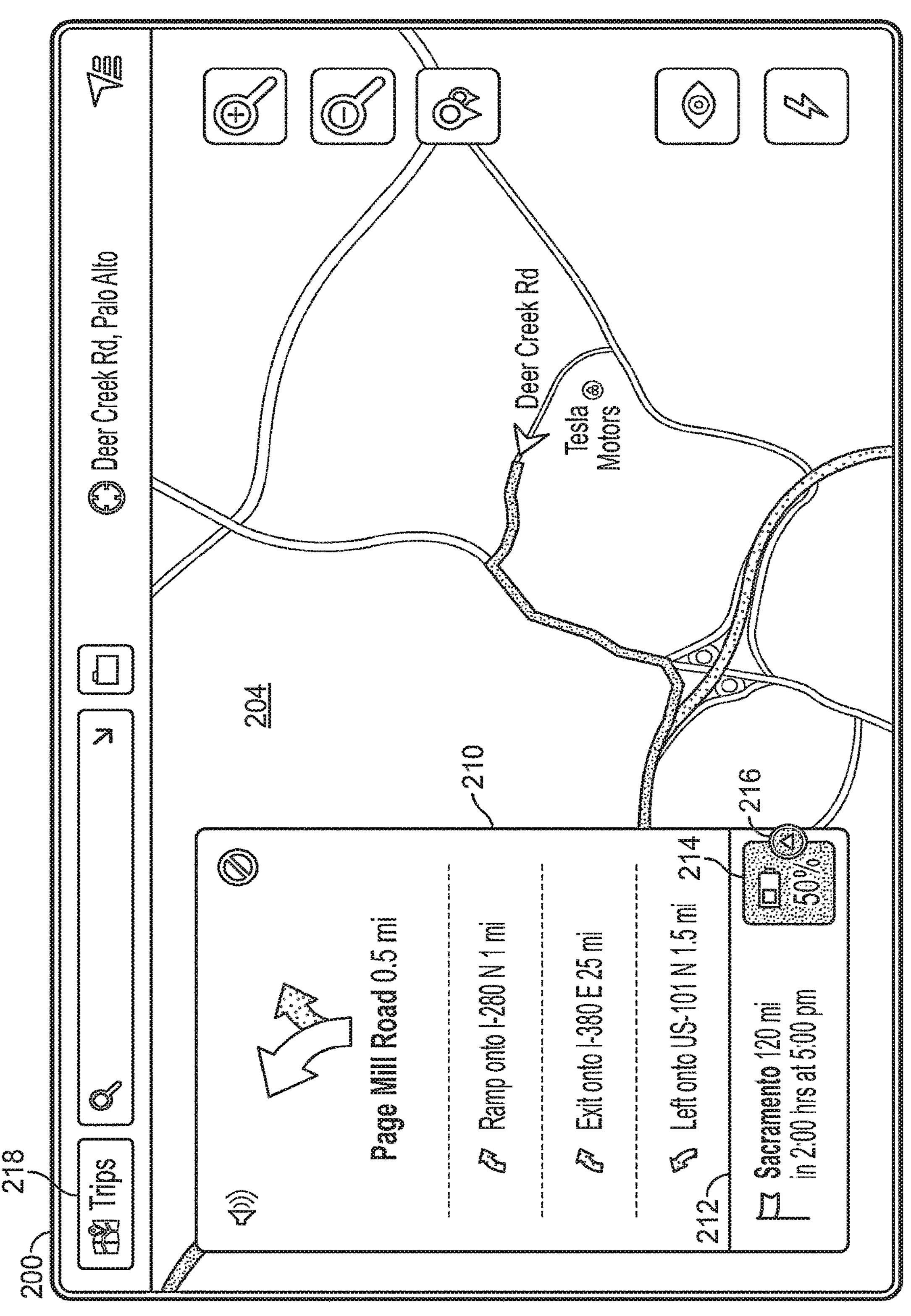
Figure 2C:
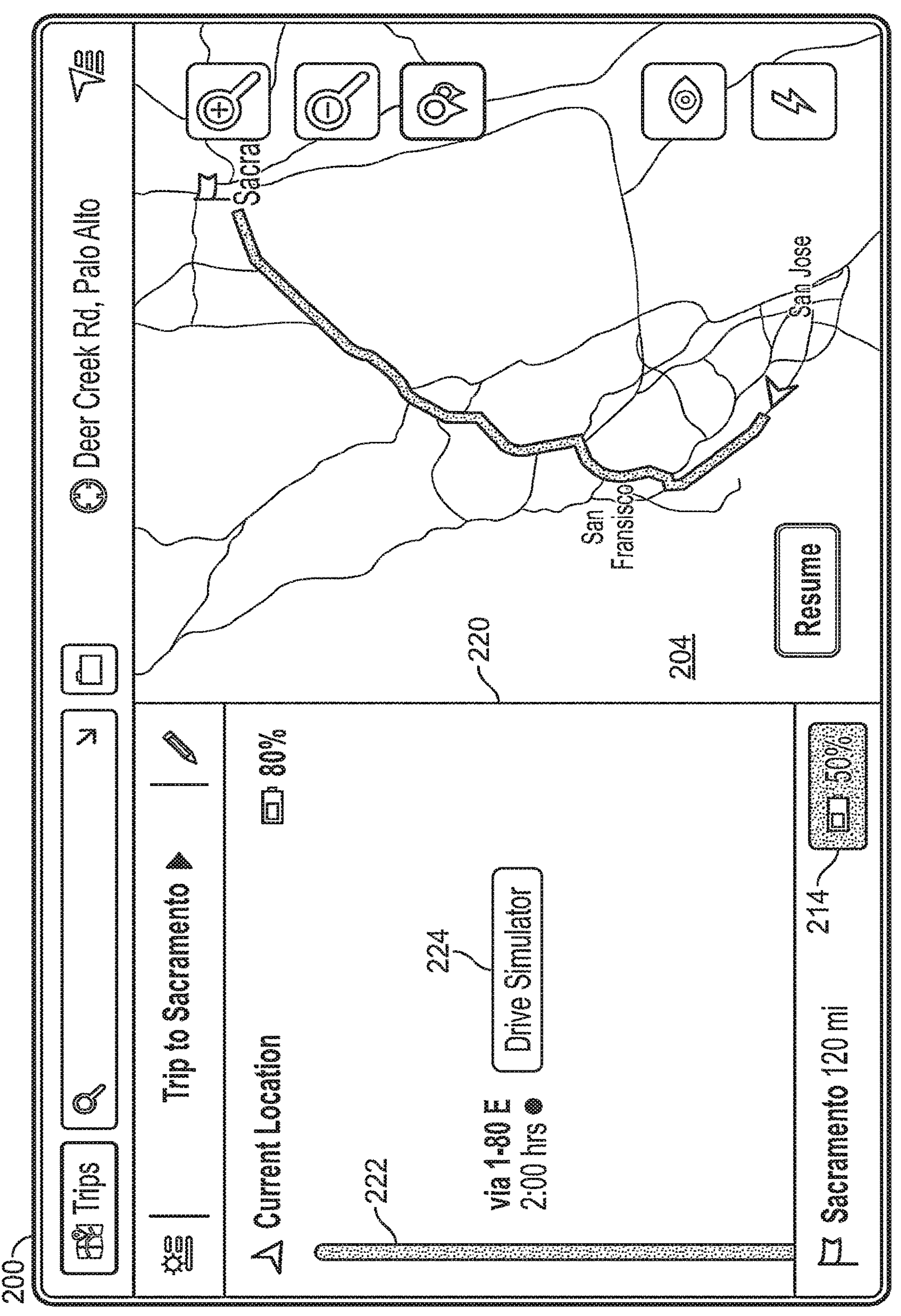

FIGS. 2A-C show an example where it is determined that a vehicle has enough energy to reach a planned destination. That is, this corresponds to the answer yes 122A (FIG. 1) wherein it is not necessary to provide any additional charging waypoint. This example will be described using a user interface 200, for example presented to the driver on some display device. The user interface has a searching function 202, such as a text entry field with a search button. Here, the search is for “Sacramento,” and a map area 204 has been updated to show Sacramento, California, which is the search result. The map area presents one or more routes against a suitable background (e.g., a map or satellite image) and can show information useful to the driver, including, but not limited to, the vehicle’s current position, energy status (e.g., level of battery charge) and predictions for the remainder of the route.

An information box 206 for the search result is presented, and this box indicates how far away the vehicle currently is from this location (in this example, 120 miles). Moreover, the information box 206 provides a control 208 for starting a new trip to that destination (i.e., to Sacramento, CA in this example). If the driver actuates the control 208, this can correspond to the inputs made in the user interface 102 (FIG. 1). That is, this can cause the trip origin (the vehicle’s current location) and the trip destination to be input to a trip planning component, for example as exemplified above. The energy calculation for the trip will then be performed and, as indicated, the current example assumes that the vehicle already has sufficient energy (e.g., enough battery charge) for the entire trip.

Accordingly, the user interface 200 can be updated to reflect the beginning of the trip, for example as shown in FIG. 2B. Here, the map area 204 now shows the vehicle’s current location, as well as the initial segments of the route that has been determined for this trip. Also displayed is an information area 210 that presents tum-by-tum driving instructions and a destination field 212. The destination field contains the name of and distance to the destination, as well as predicted timing information for the drive (e.g., the estimated duration and time of arrival).

The destination field 212 also contains an energy indicator 214 that shows the energy level that the vehicle is estimated to have when reaching the destination (in this example, 50% energy remaining). That is, the energy indicator 214 associated with the destination is an example of an energy-versus-distance measure. The energy indicator and the vehicle route can be colored (or shaded or patterned) to reflect that the vehicle is predicted to have enough energy to reach the destination without recharging or refueling. For example, the route and the energy indicator can be shown in green.

An indicator 216 reflects the direction in which the value of the energy indicator 214 is currently trending. In this example the arrow points upward, meaning that the predicted remaining energy is tending toward being higher than the currently displayed value (i.e., more than 50%). This trend is based on monitoring factors that affect energy efficiency, such as driving speed and use of climate control. That is, if the vehicle is currently being driven slower than assumed in the energy calculation, this indicates that less energy will be used than was predicted, and so the indicator can be presented as an upward pointing arrow. Similarly, if the vehicle is being driven in a way that uses more energy than in the estimated calculation, a downward arrow can be shown.

If the user selects a trip overview control 218, the user interface can be updated to show information about the entire trip. FIG. 2C shows an example of this where the map area 204 now shows the route for the entire trip, with a marker for the vehicle’s current location. The user interface also shows a trip information area 220 about the planned trip. The trip information area presents the current location with an energy indicator (presently at 80%) and the destination with the energy indicator 214. A route element 222 represents the route between the current location and the destination and is presented with some relating information, such as that the route goes via interstate 1-80 and is estimated to take two hours. The route element can have the same color (or shading or pattern) as the route in the map area 204 and as the energy indicator (e.g., green). The colored/shaded/patterned route element 222 is another example of an energy-versus-distance measure.

Examples herein are described in terms of the vehicle’s driver being the user of various systems. This is done for purpose of simplicity only, and it is contemplated that the described systems and techniques are used only in manners that comply with applicable laws or regulations. For example, a driver may need to stop the vehicle before safely operating the system.

A drive simulator control 224 allows the driver to explore the energy-related effects of changing some aspect of the driving behavior or the vehicle's settings, and will be described in examples below.

FIGS. 3A-E show an example where the vehicle does not have enough energy to reach a planned destination and the user manually adds a charging waypoint. That is, this corresponds to the scenario in FIG. 1 wherein the energy sufficiency determination results in the no 122B, followed by the option 132C.

Similar to the previous example, the driver uses the searching function 202 but here enters "Los Angeles" instead. Accordingly, the map area 204 and the information box 206 now reflect that Los Angeles, California, is a result to the driver's search. In this example, that location is 350 miles from the vehicle's current position.

If the driver actuates the control 208, the route to the destination will be determined, and the energy calculation will be carried out to determine whether the vehicle currently has enough energy for the entire trip. In this example, it is assumed that the vehicle must be recharged/refueled along the way.

Figure 3A:
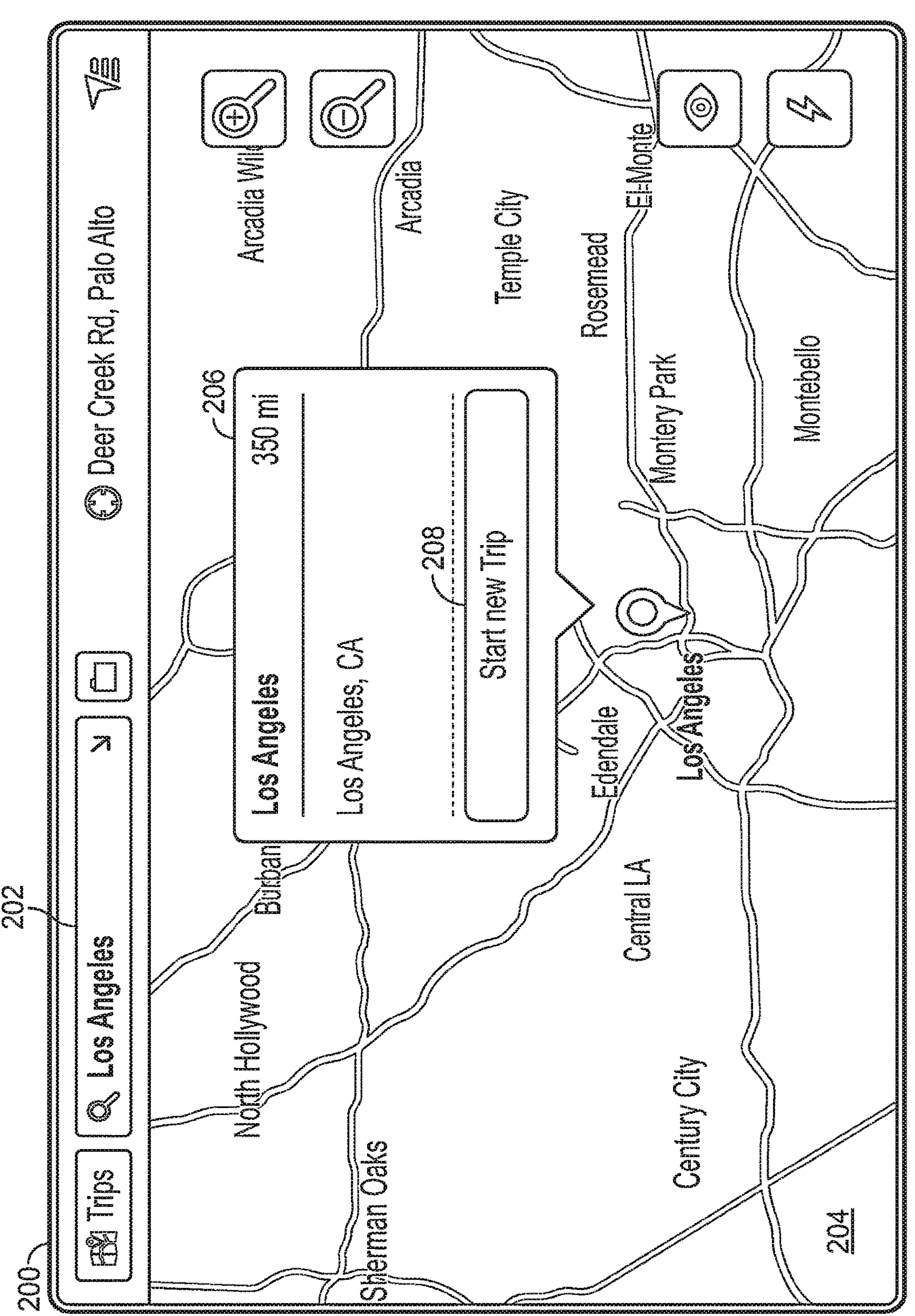
FIGS. 3A-E show an example where the vehicle does not have enough energy to reach a planned destination and the user manually adds a charging waypoint.
Figure 3B:
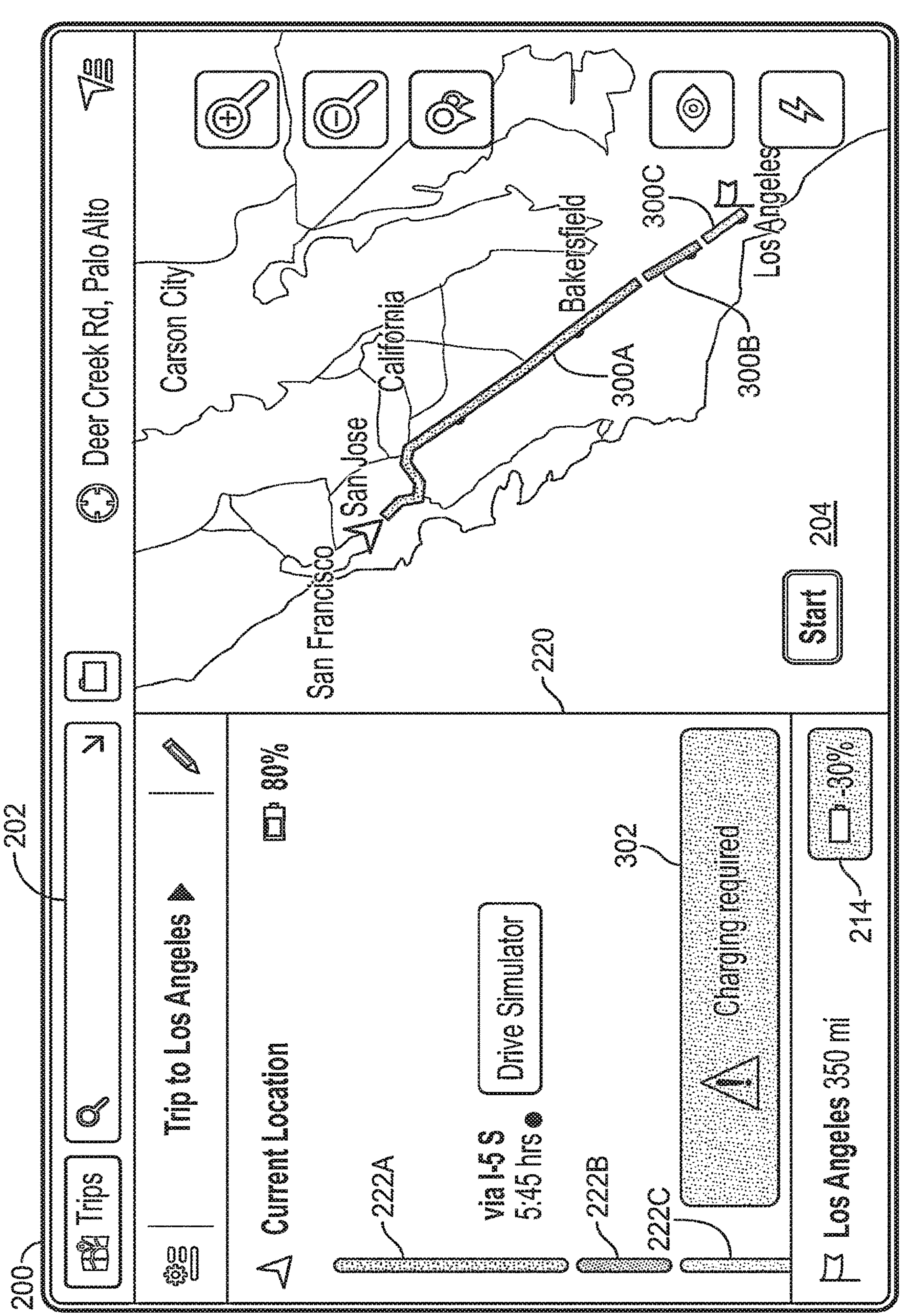

The user interface 200 can therefore be updated as shown in FIG. 3B. That is, the map area 204 now shows the entire route, indicated by route elements 300A-C. The trip information area 220 shows the current location (where the vehicle has 80% charge remaining) and the destination, where the energy indicator 214 shows a 30% deficiency (i.e., negative 30%). Route elements 222A-C in the trip information area correspond to the respective route elements 300A-C in the map area. Each route element can be colored (or shaded or patterned) to reflect the predicted remaining energy level during that part of the route. The colored/shaded/patterned route elements 300A-C are examples of energy-versus-distance measures.

For example, during the part of the trip corresponding to the route elements 300A and 222A, the energy is predicted to be sufficient, and these route elements can be colored green. At some point during the trip, however, the vehicle's stored energy (e.g., battery charge) is predicted to fall below a predefined threshold (e.g., 10% remaining). Accordingly, this defines the beginning of the route elements 300B and 222B, and these route elements can therefore be highlighted differently (e.g., in yellow color). Finally, the prediction indicates that the vehicle would run out of energy (unless recharged/refueled), and this is indicated by the route elements 300C and 222C, which can be highlighted accordingly (e.g., in red). However, to prevent such situation from occurring, the system can present alert 302 to the driver so that appropriate measures can be taken.

For purpose of illustrating the manual addition of a charging waypoint, it is here assumed that the system does not know of any available charging stations along the planned route. That is, the current example is based on the premise that the source 126 (FIG. 1) does not contain any charging waypoint that fits the need of this vehicle for this particular route.

Figure 3C:
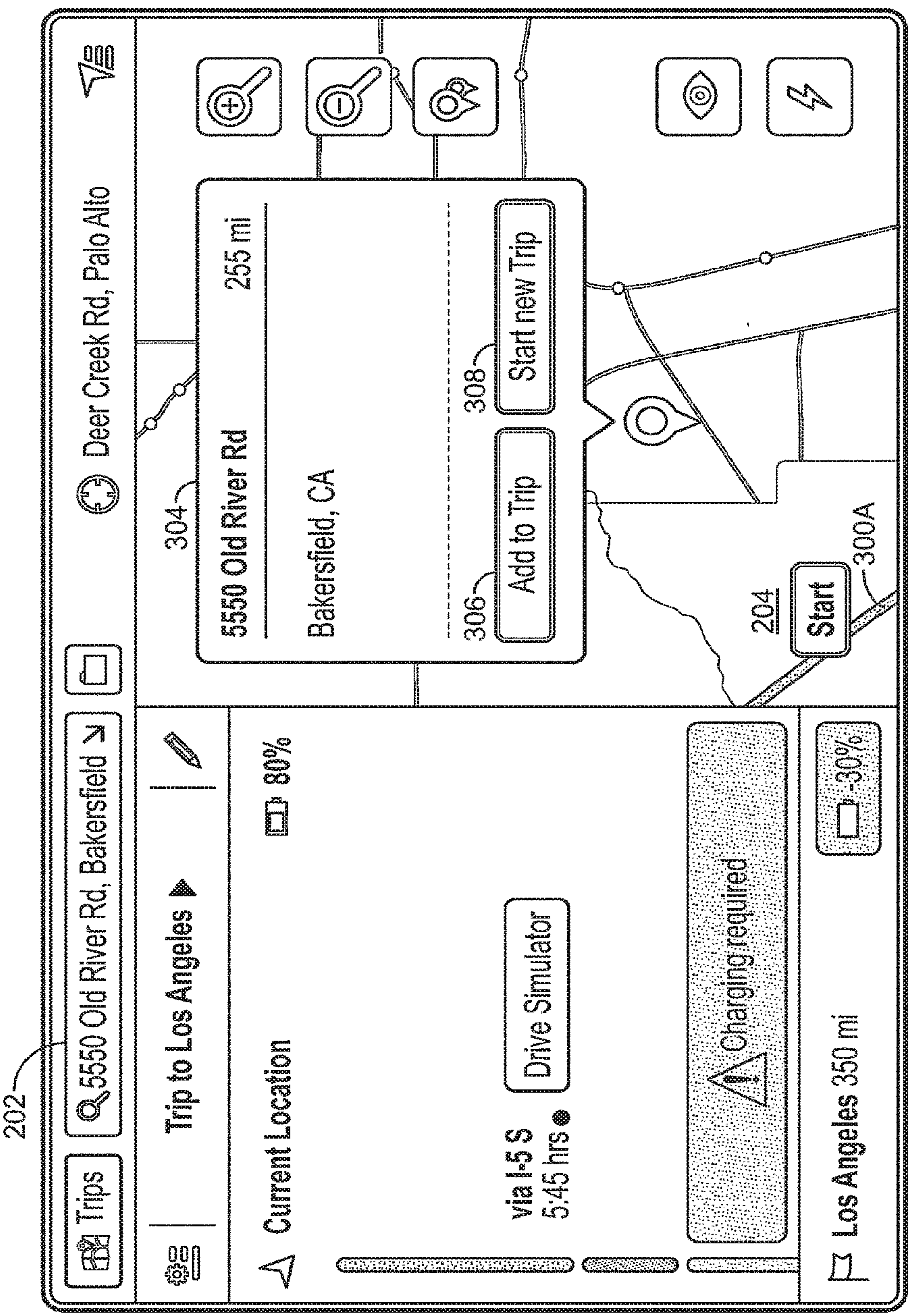

The driver can then inform the system about an available place for charging. That is, the source 126 (FIG. 1) is here expected to contain all public charging stations, but the driver can update the system about a private or semi-private charging station that the driver knows is available. Here, the driver enters "5550 Old River Rd, Bakersfield" into the search function 202, and the user interface can then be updated as shown in FIG. 3C. The map area 204 now shows the area around Bakersfield, California, and a waypoint box 304 is presented. The waypoint box indicates the distance to this location (here 255 miles) and provides a control 306 for adding this location to the trip as a waypoint, whereas a control 308 allows the driver to instead start a new trip. The route element 300A is here visible and indicates that the new location is near the originally planned route. In this example, the driver actuates the control 306 and the system will then again perform route determination and energy calculation, with the difference that the waypoint has been added to the route.

Figure 3D:
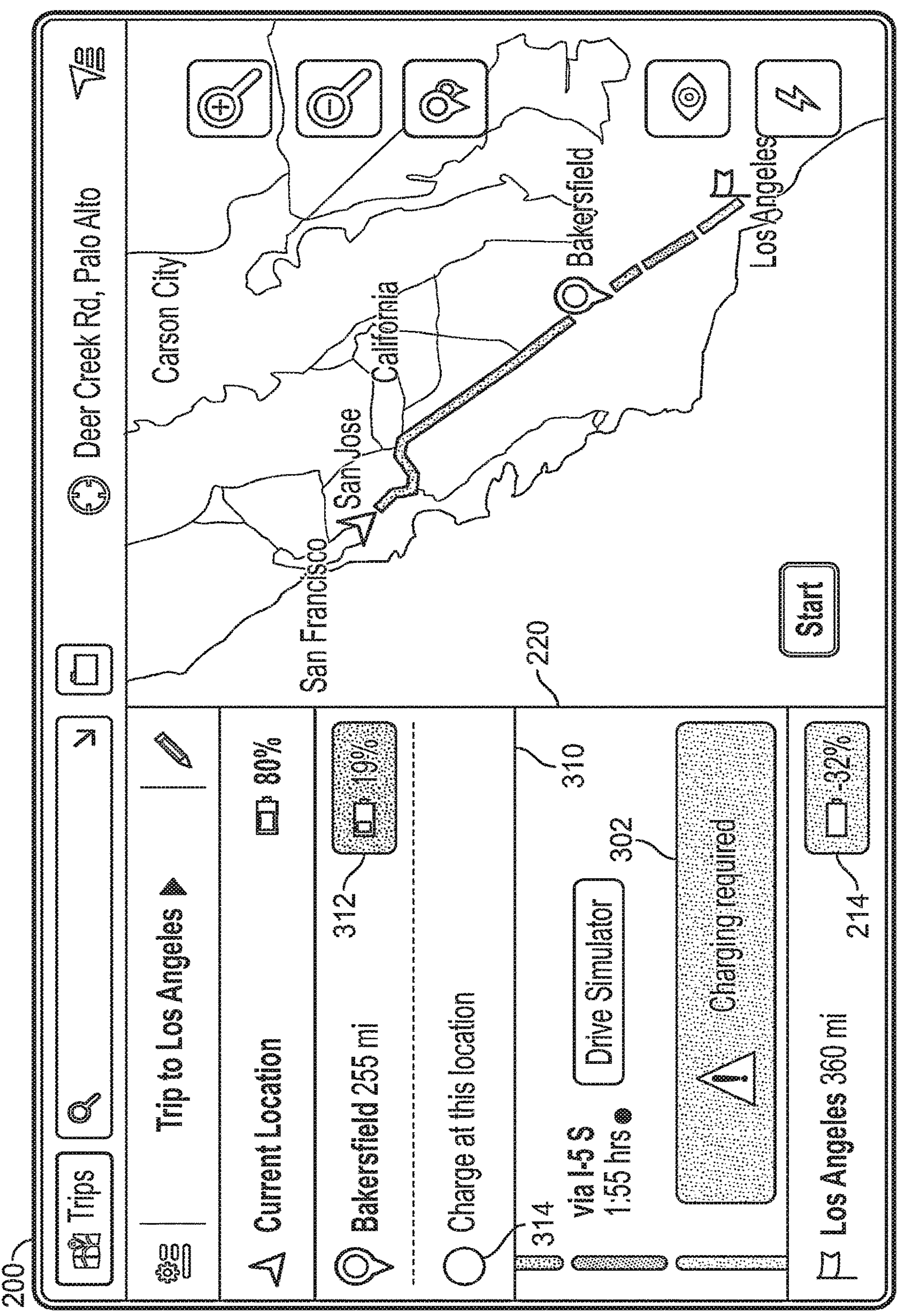

FIG. 3D shows an example of the user interface 200 after a waypoint has been added. At the moment, the new location (i.e., Bakersfield, CA) has been added to the trip as a waypoint, but the system is not yet taking into account any additional charging at this waypoint. Accordingly, the trip information area is updated with a waypoint area 310 for Bakersfield, and this area contains an energy indicator 312 that shows the vehicle's predicted level of remaining energy upon reaching this waypoint (here 19%). Also, the energy indicator 214 for the final destination now shows negative 32% instead of 30%, which reflects that the vehicle will use a small amount of energy (here about 2%) in departing from the original route (e.g., the interstate highway) and visiting the specified location in Bakersfield. Finally, the alert 302 still informs the driver that charging is required in order to reach the final destination as planned.

Figure 3E:
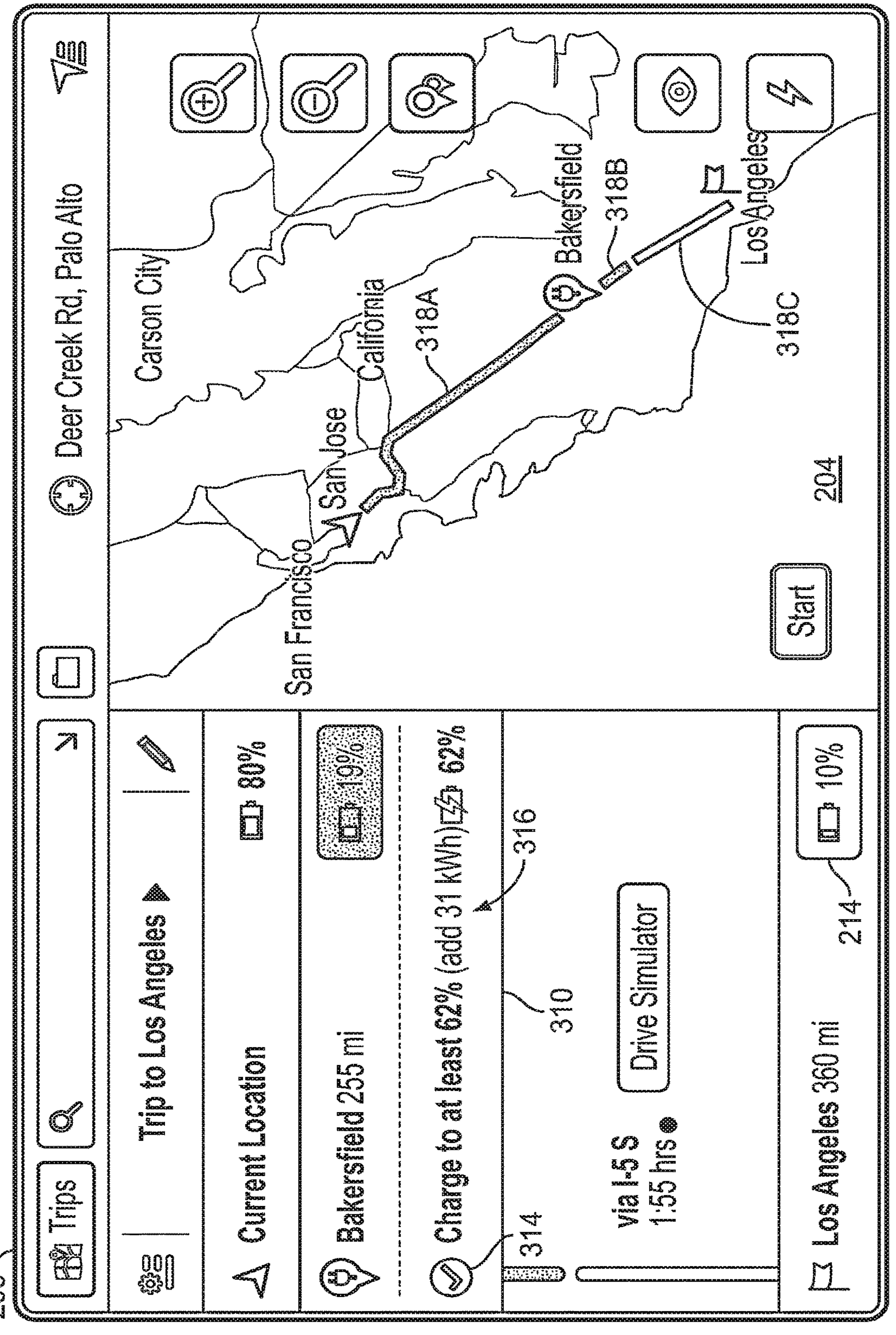

A control 314 in the waypoint area 310 allows the driver to specify that the vehicle will be charged (or have its electric battery exchanged, or be refueled, as the case may be) at this waypoint. If the user actuates the control 314, this triggers the system to define Bakersfield as a charging waypoint, and the user interface 200 can then be updated as illustrated in FIG. 3E.

Here, the control 314 has changed to show an active state, and an instruction 316 is provided in the waypoint area 310. In this example, the driver is instructed to charge the vehicle to at least 62% state of charge, which here corresponds to adding 31 kWh to the vehicle's battery. According to energy indicator 214 for the destination, the vehicle is now expected to have 10% energy remaining upon reaching the destination. That is, upon a charging waypoint being added to the route, the system can start with a threshold value of how much energy should remain when arriving at the destination (in this example 10%). The system can then configure the instruction 316 so that the threshold value is expected to be met.

The map area 204 can be updated with a marker indicating that the vehicle should be charged at the newly added location. Also, the route elements 300A-C (e.g., in FIG. 3B) can be revised to reflect the change in the vehicle's energy situation. For example, a first route element 318A here represents the first part of the trip until the charging waypoint. A second route element 318B represents the part of the trip between recharging (or refueling) and the point where the vehicle's energy level is predicted to fall below a predefined threshold. Accordingly, while traveling the route elements 318A-B the vehicle is predicted to remain above the predefined threshold and these elements can therefore have the same type of color/shade/pattern (e.g., green color). By contrast, a third route element 318C that represents the last part of the trip after the energy threshold is no longer met, can be highlighted in a different way (e.g., by a green outline). However, now that the charging waypoint has been added to the route the vehicle is no longer predicted to reach the low energy levels of the previous route elements 300B-C (e.g., in FIG. 3B).

Figure 4A:
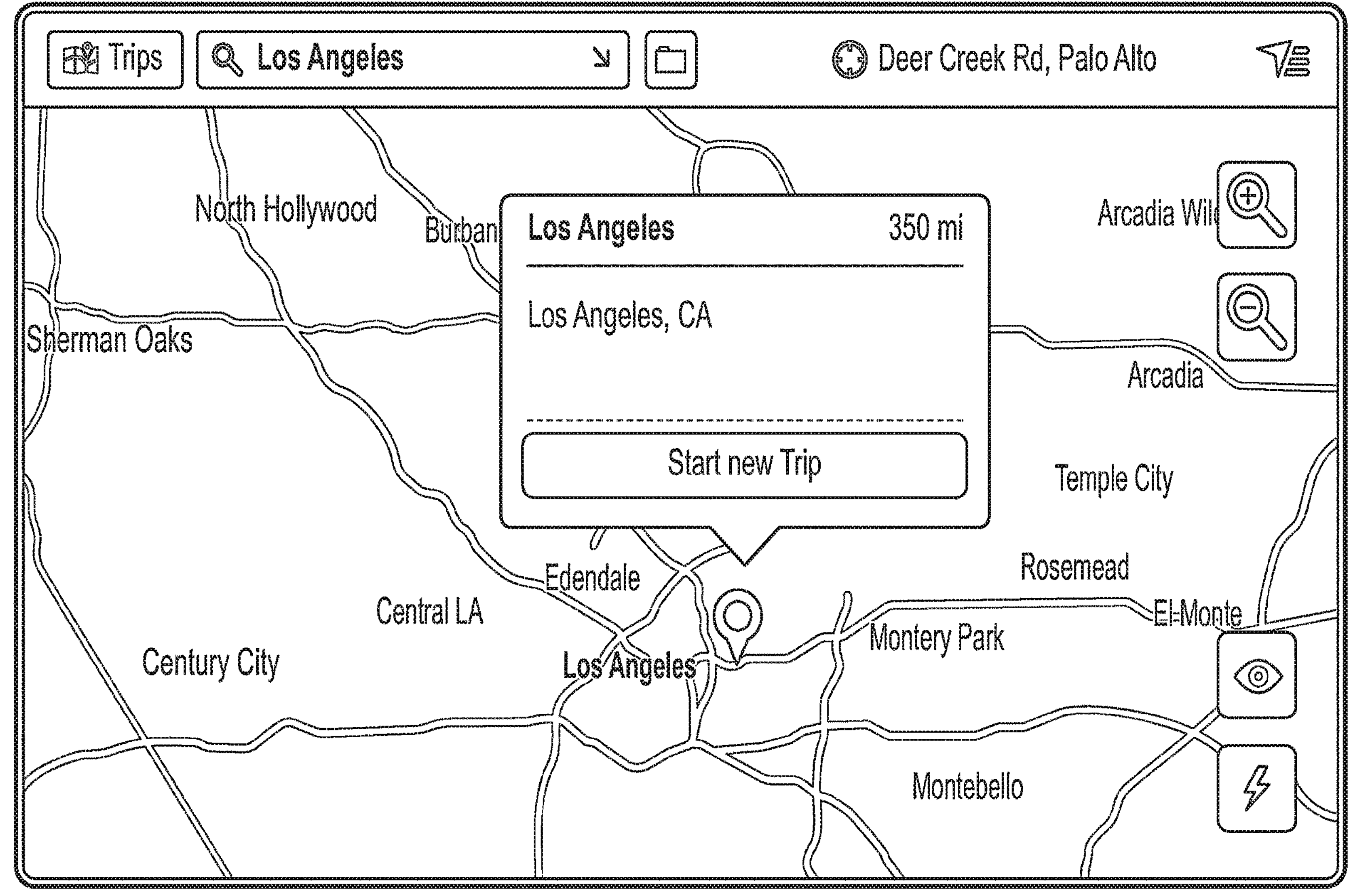
FIGS. 4A-D show an example where the vehicle does not have enough energy to reach a planned destination and the user selects a charging waypoint suggested by the system.
Figure 4B:
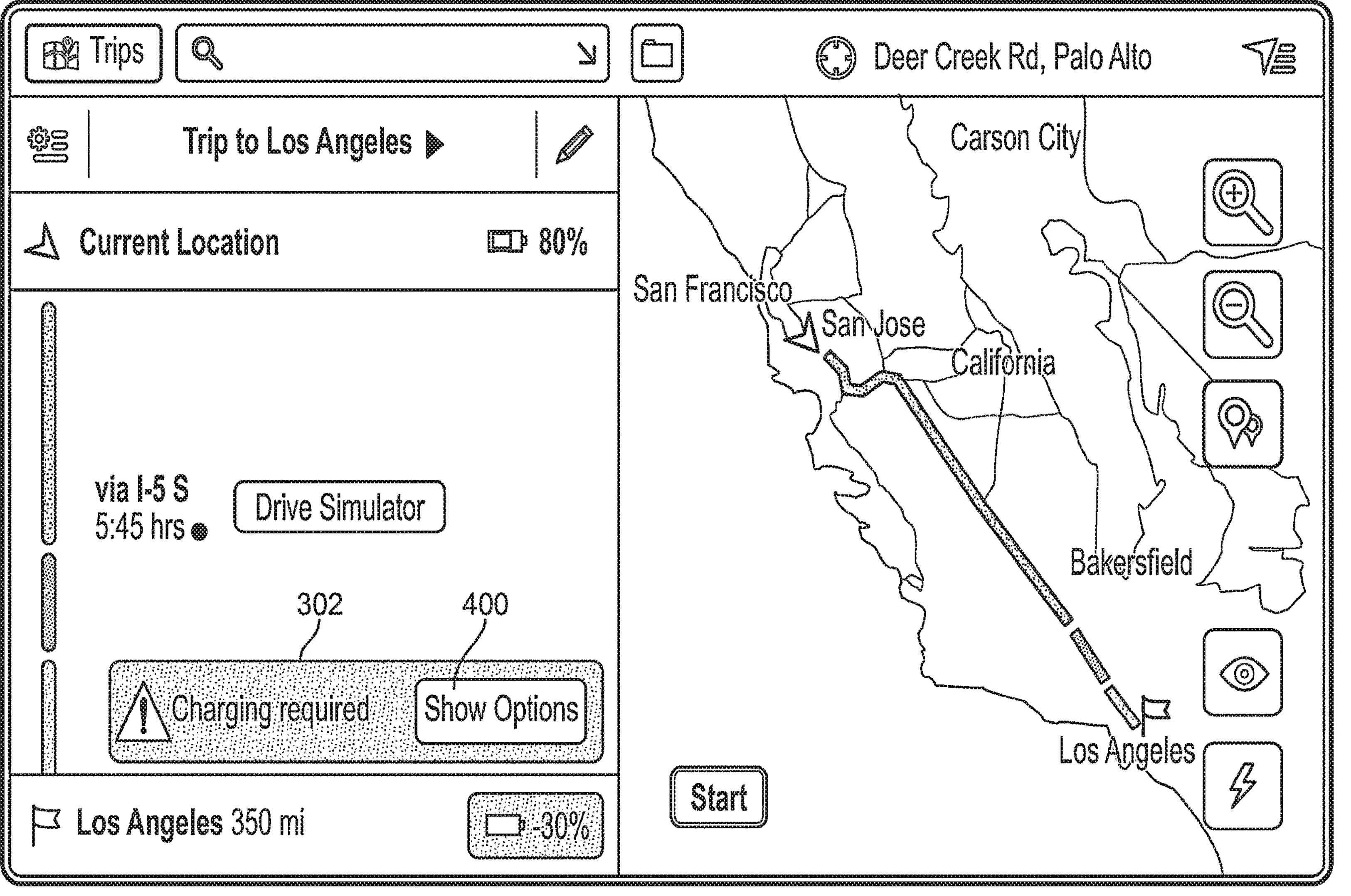

FIGS. 4A-D show an example where the vehicle does not have enough energy to reach a planned destination and the user selects a charging waypoint suggested by the system. Similar to the previous example, the driver searches for Los Angeles, starts a new trip to this destination, and is informed by the system that charging is required. In this regard, FIGS. 4A-B are similar to FIGS. 3A-B. However, in this example the system does know of at least one available charging waypoint and FIG. 4B therefore includes a control 400 in the alert 302. The control 400 provides available options for charging depending on the particular route and the current energy level, and the driver here actuates the control.

Figure 4C:
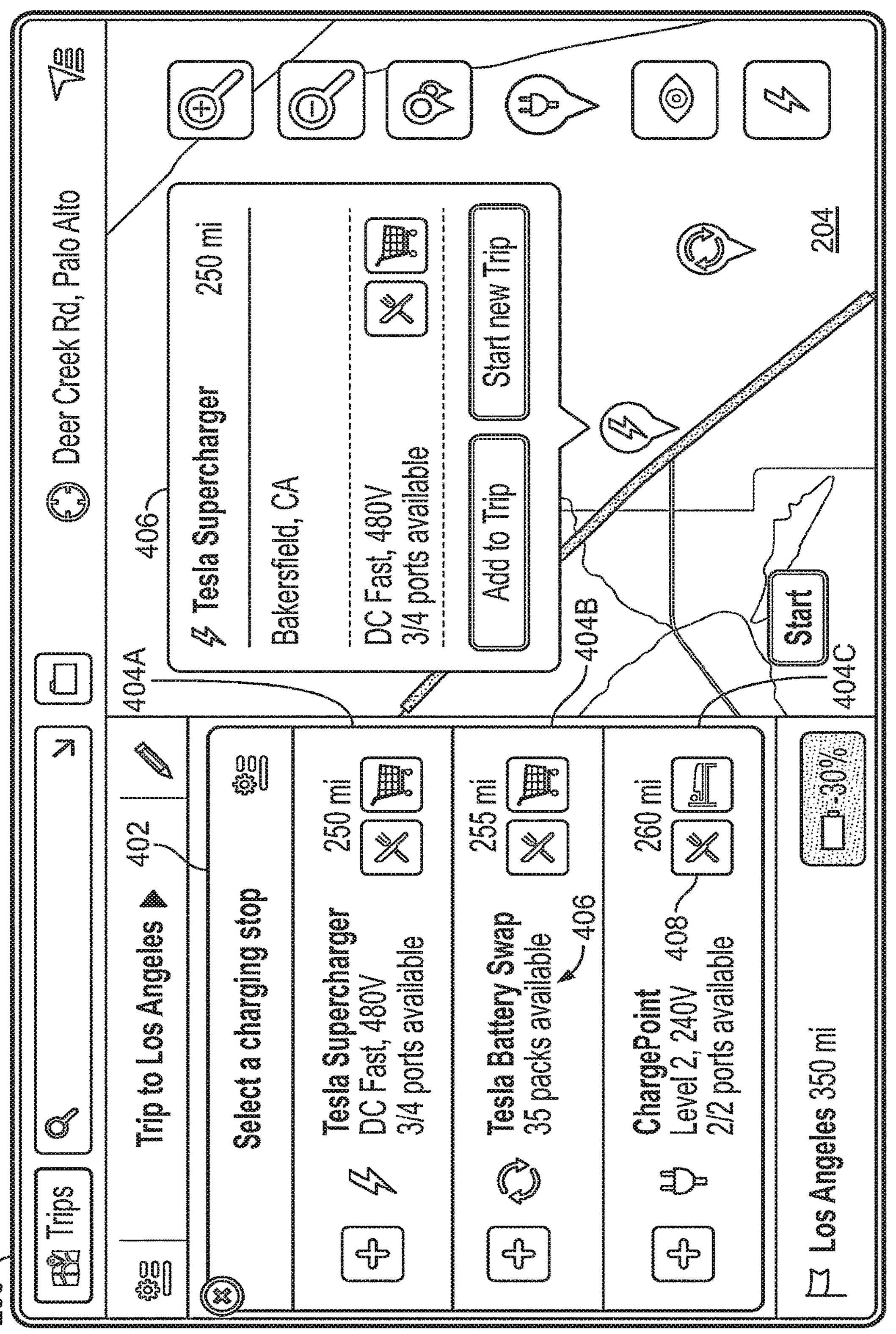

FIG. 4C shows an example of how the user interface 200 can be updated to show available options for charging. A selection area 402 presents one or more charging stops for the driver to choose between. These options are presented by the system as suggestions to the driver and may have been chosen from among the charging stations in the source 126 (FIG. 1). Any suitable facilities for replenishing the car with energy can be presented. For example, option 404A corresponds to a Tesla Supercharger, option 404B is a Tesla battery swap station, and option 404C is a ChargePoint station. Each of the options 404A-C can present availability information 406 and at least one services icon 408. For example, this can indicate whether there is likely to be a wait at the station and what the driver (and any passengers) might do while the vehicle is being charged.

Here, the option 404A has been selected (e.g., by default) and this triggers the system to present an information box 406 in the map area 204. The information box contains information about the particular stop and also provides the controls 306 and 308 for adding the charging waypoint to the trip, or starting a new trip, respectively. Here, the driver chooses to add the option 404A to the trip.

Figure 4D:
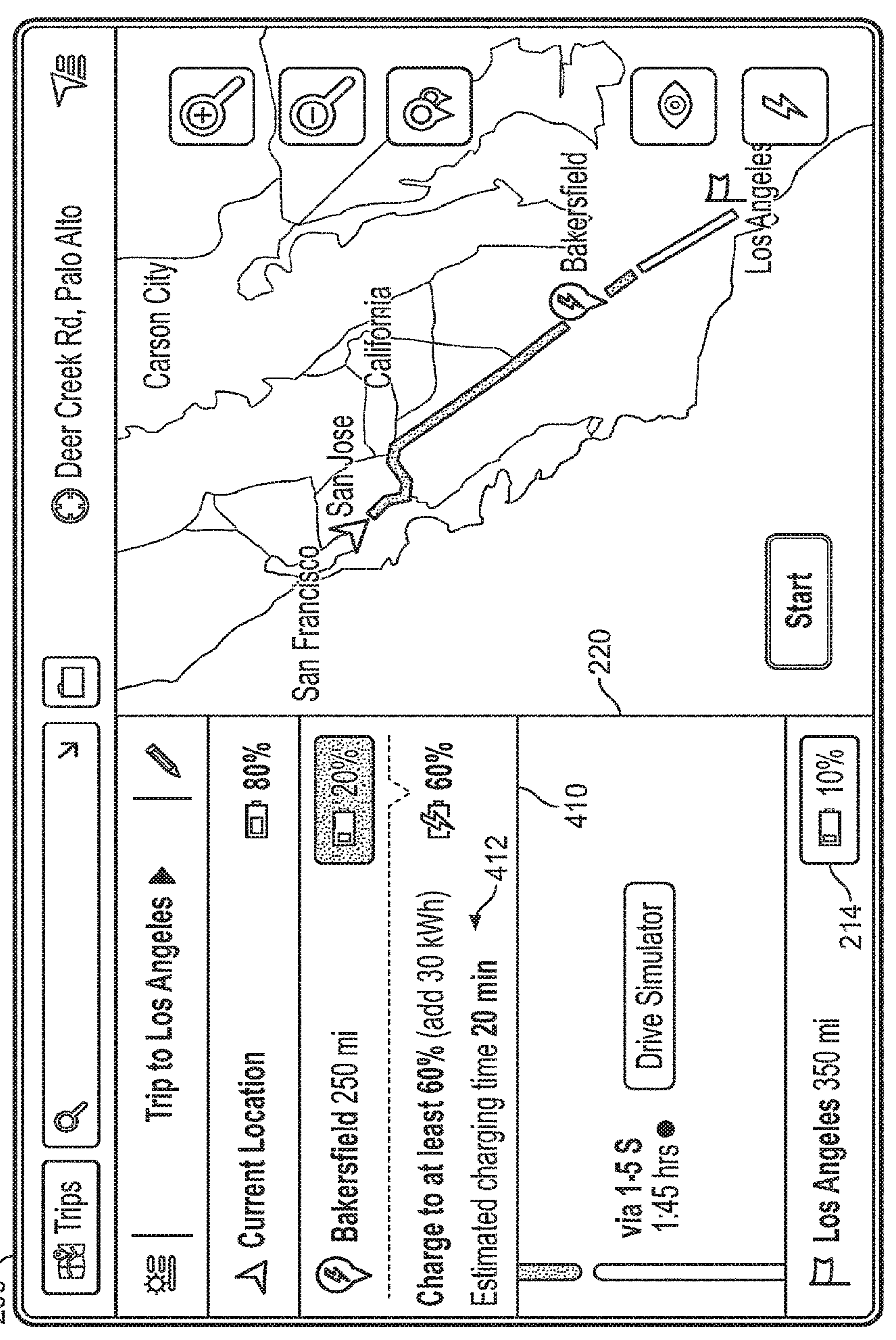

Based on the added charging waypoint, the system again determines the route and performs the energy calculation. FIG. 4D shows that the user interface 200 has been updated so that the trip information area 220 contains a charging waypoint area 410 for Bakersfield. Charging instructions 412 and other relevant information can be presented in the charging waypoint area. Accordingly, the energy indicator 214 is now updated based on the charging that is expected to be done at the newly added charging waypoint.

In some implementations, the vehicle's communication equipment (e.g., a built-in 3G or 4G device) can remotely access a reservation system for the selected facility to determine availability, and the driver can be assigned a reserved time slot upon selecting a particular option.

Figure 5A:
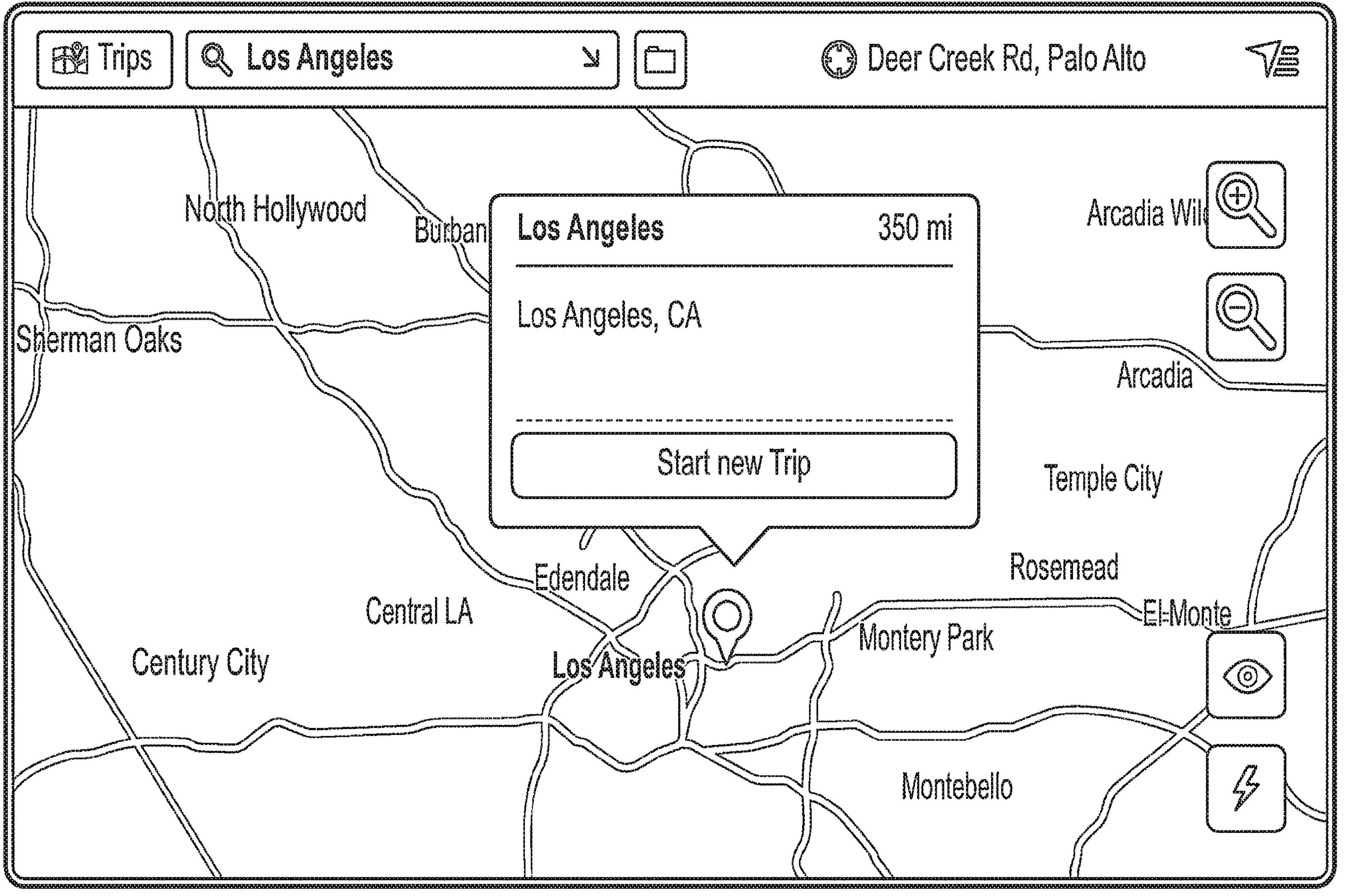
FIGS. 5A-D show an example where the vehicle does not have enough energy to reach a planned destination and the system automatically adds a charging waypoint.
Figure 5B:
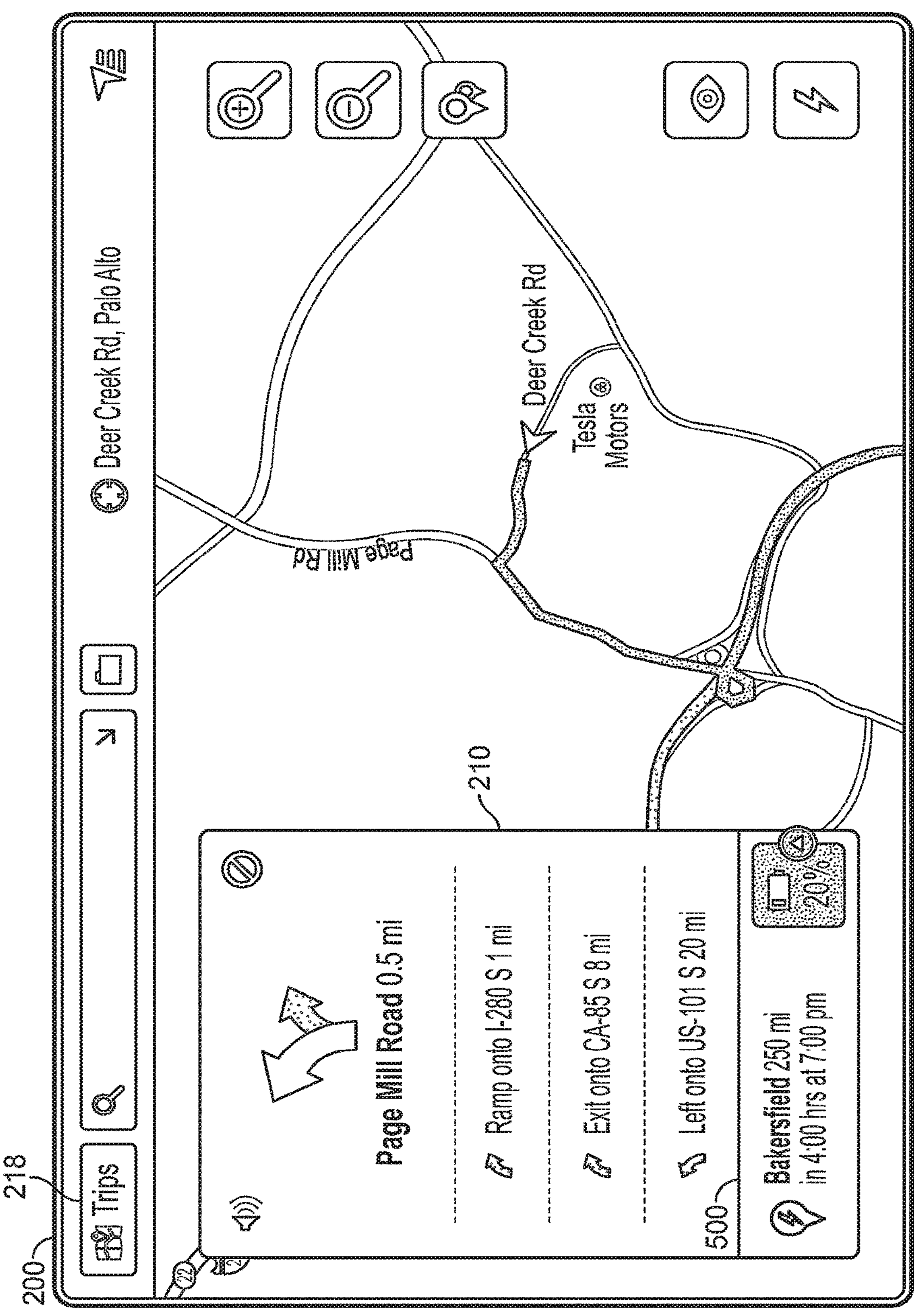

FIGS. 5A-D show an example where the vehicle does not have enough energy to reach a planned destination and the system automatically adds a charging waypoint. Similar to the previous examples, the driver searches for Los Angeles, starts a new trip to this destination, and is informed by the system that charging is required. In this regard, FIG. 5A is similar to FIG. 3A. However, in this example the system automatically adds a charging waypoint to the trip when detecting that charging is required for the trip. FIG. 5B therefore shows that the user interface 200 has been updated so that information area 210 shows a charging waypoint area 500 corresponding to the automatically added charging waypoint. That is, the area 210 now instructs the driver on the route to take so that the vehicle arrives at the Bakersfield charging station, and the rest of the trip beyond that point is not currently visible.

Figure 5C:
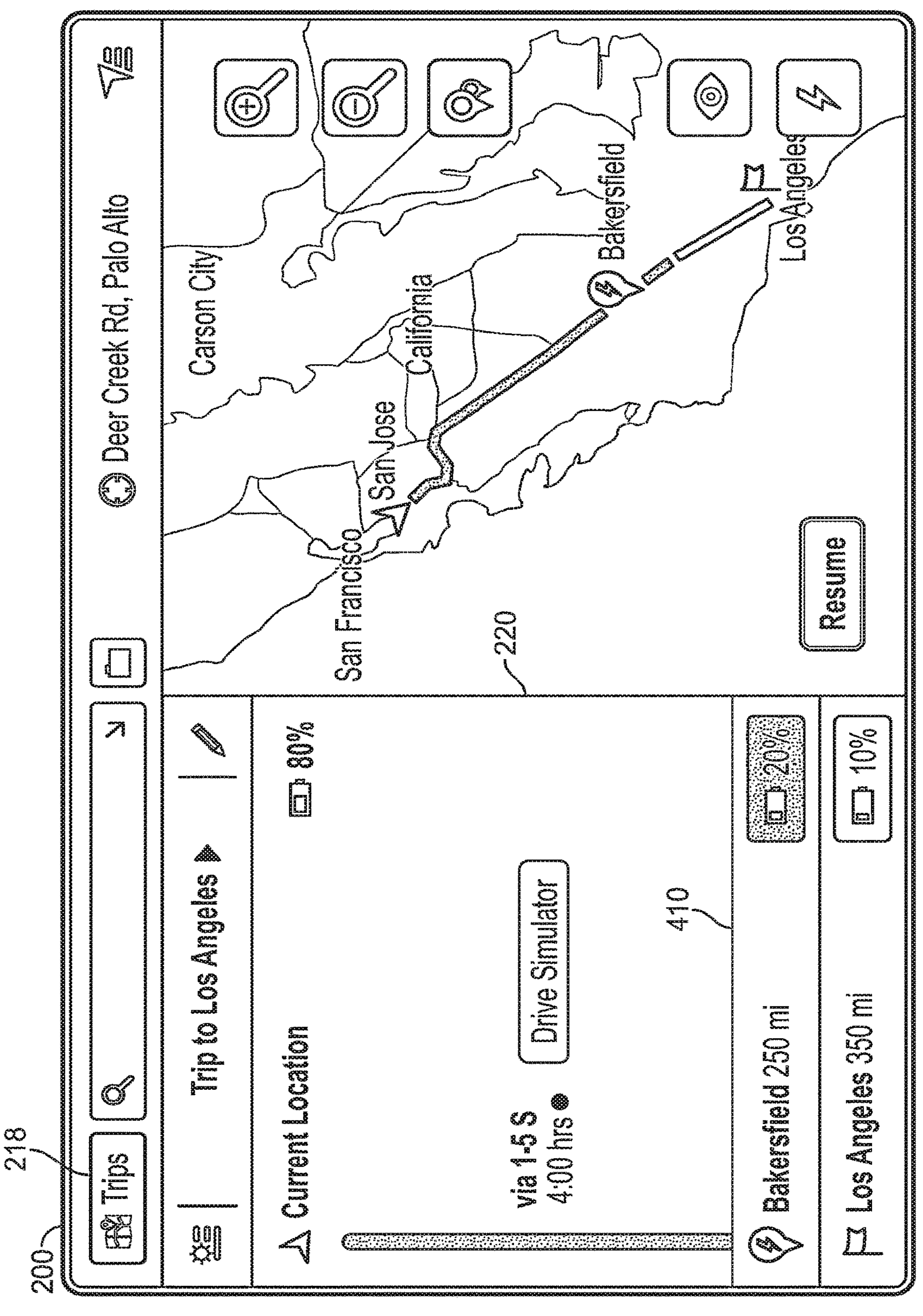
Figure 5D:
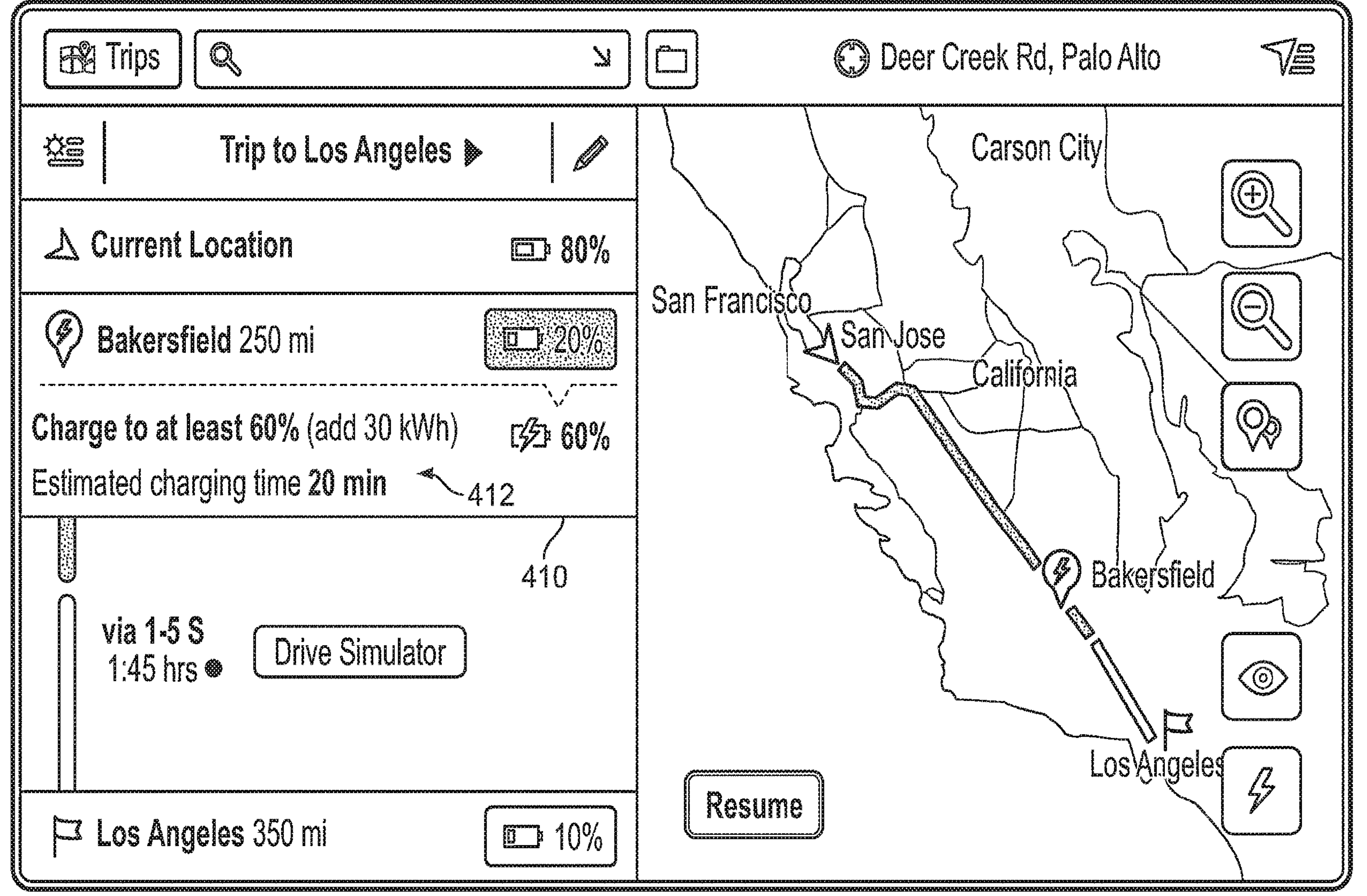

However, to overview the entire trip, the driver can actuate the control 218, and the user interface 200 can then be updated as illustrated in FIG. 5C. Particularly, the trip information area 220 now contains the charging waypoint area 410. If the driver actuates (e.g., clicks on or otherwise selects) the charging waypoint area 410, it can be moved to reveal more information, for example as shown in FIG. 5D. Here, instructions 412 regarding the charging are presented to the driver.

Figure 6A:
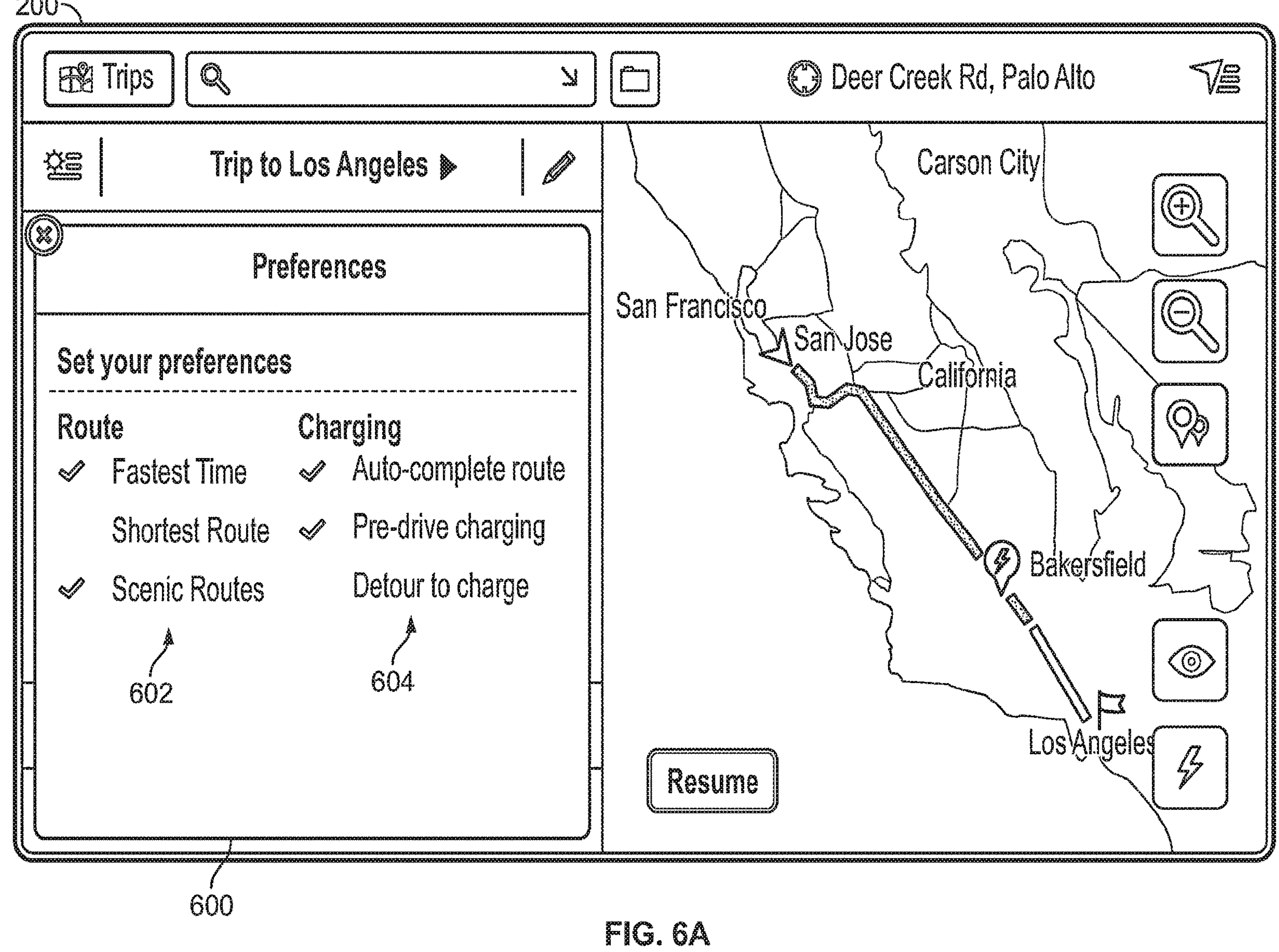
FIGS. 6A-C show examples of user preferences, suggestions and custom route.
Figure 6B:
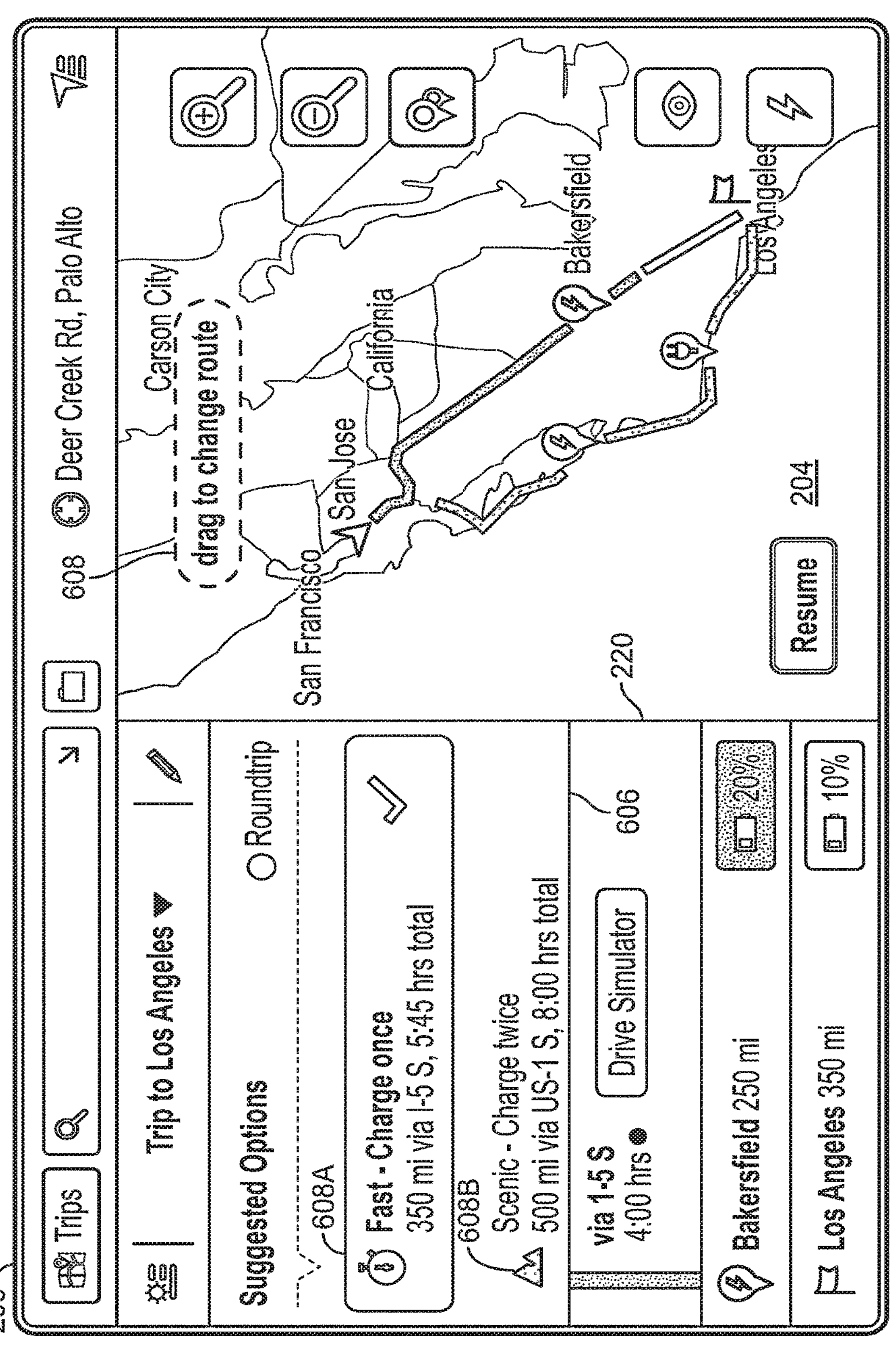
Figure 6C:
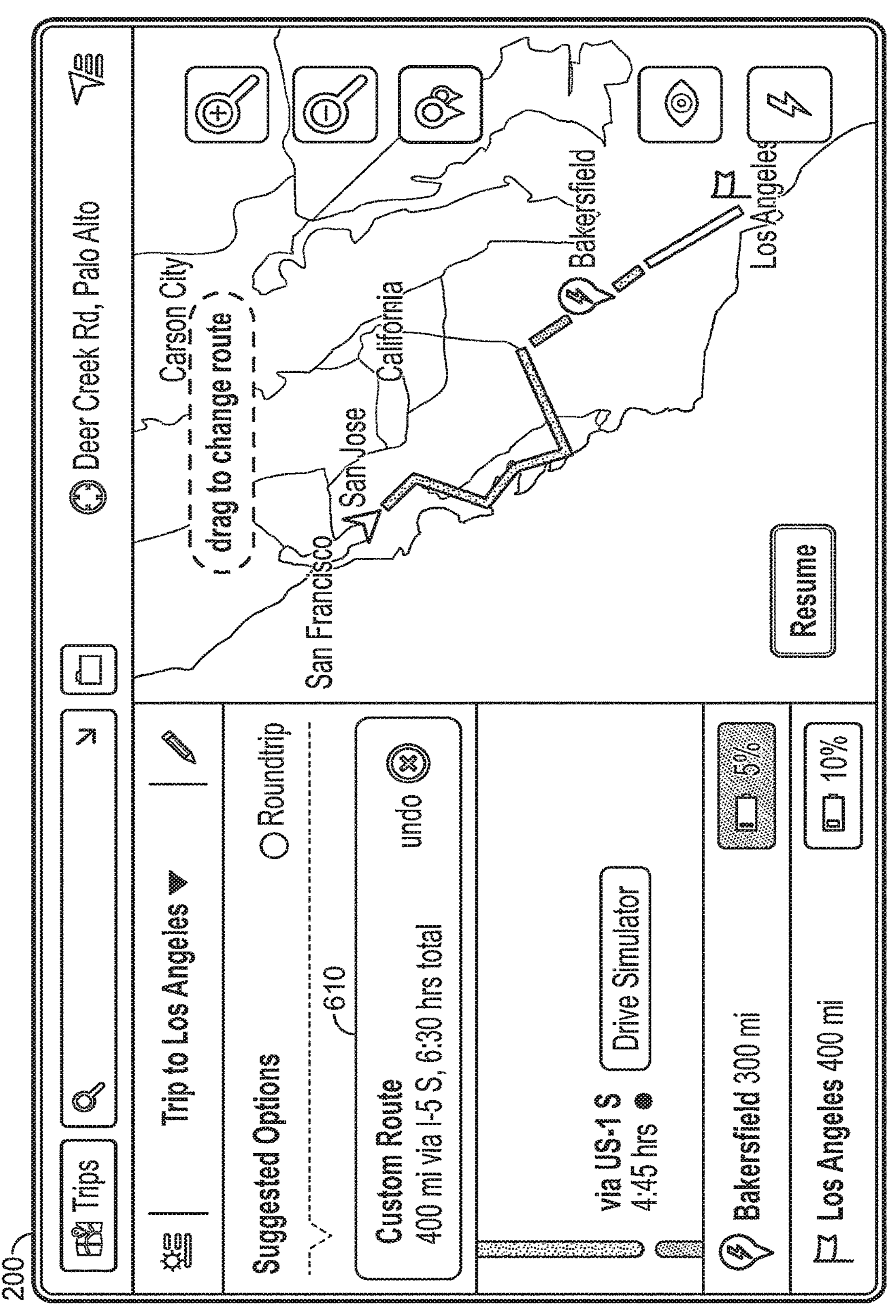

FIGS. 6A-C show examples of user preferences, suggestions and custom route. In FIG. 6A, the user interface 200 contains a preferences area 600 where the driver can make one or more inputs that will affect how the system routes the trip and/or how the system addresses energy replenishment. Particularly, route preferences 602 allow the driver to choose between having the system pick the fastest route or the shortest route, and whether scenic routes should be taken into account. Charging preferences 604 allow the driver to choose between having the system automatically complete the route when adding the charging waypoint(s), or whether pre-drive charging should be considered, or whether a detour to charge should be considered. After the user selects one or more preferences, and/or clears one or more previously selected preferences, the system takes the driver's current preferences into account when relevant.

FIG. 6B shows an example where the system presents options to the driver to choose between. For example, the trip information area 220 here contains an options area 606 that shows options 608A-B. For example, the option 608A contains a short route (350 miles) that will require only one charging stop. This option may be attractive to a driver who prioritizes speed in order to make the trip faster. The option 608B, in contrast, includes a scenic route and therefore corresponds to a longer route (500 miles), which will require two charging stops. The respective routes can be shown on the map area 204. The option that the driver selects will trigger the system to plan the route accordingly.

In some implementations, the driver can select a custom route. An instruction 608 here indicates that the driver can drag the presented route element(s) to change the route. For example, FIG. 6C shows an example where the driver started with the more direct route and partially rerouted it so that it initially runs closer to the ocean. A custom route area 610 can then be presented in the user interface 200, and can present relevant information (e.g., total distance and/or estimated travel time) and allow the driver to undo the route change.

Figure 7A:
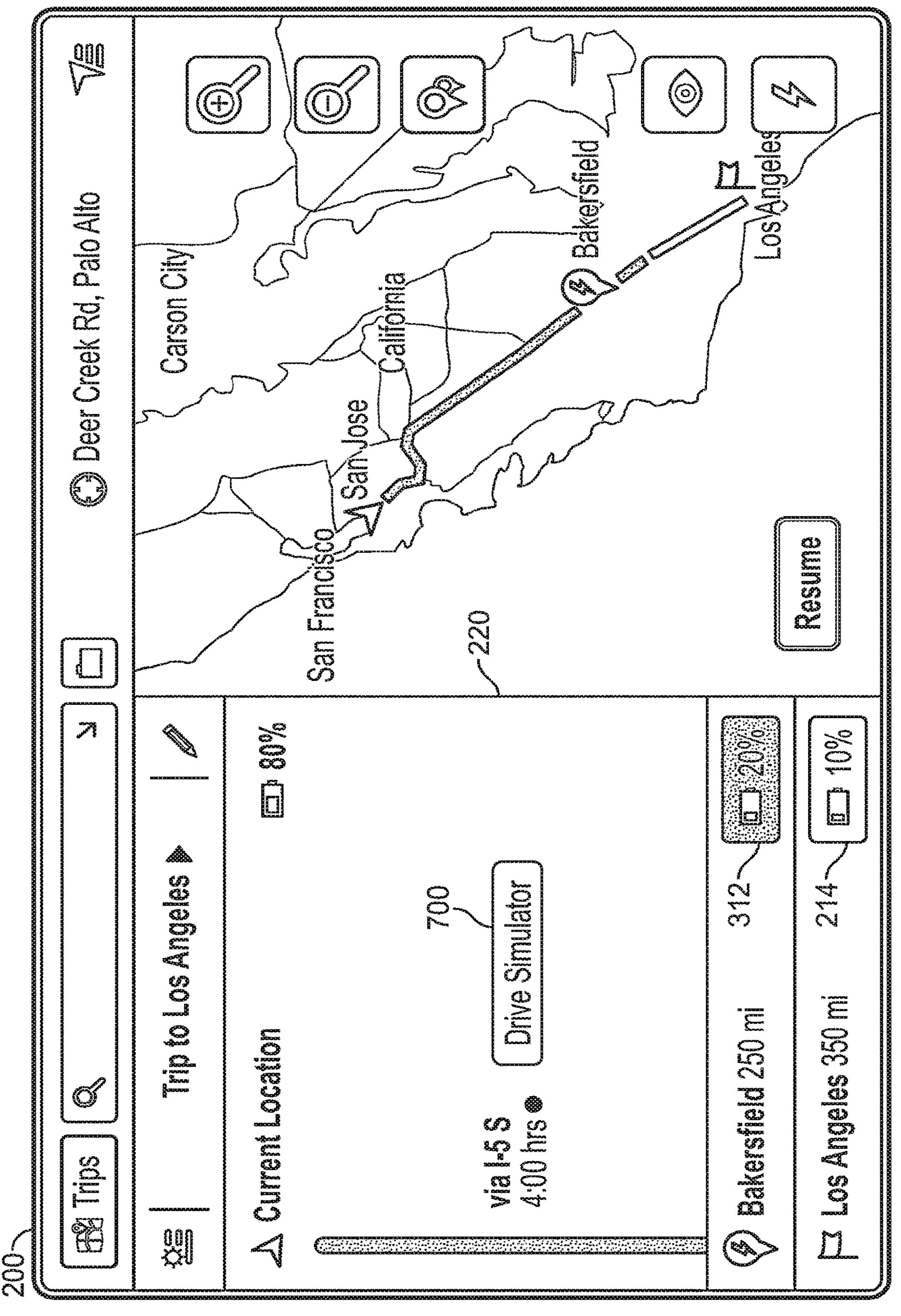
FIGS. 7A-C show an example of using a drive simulator.
Figure 7B:
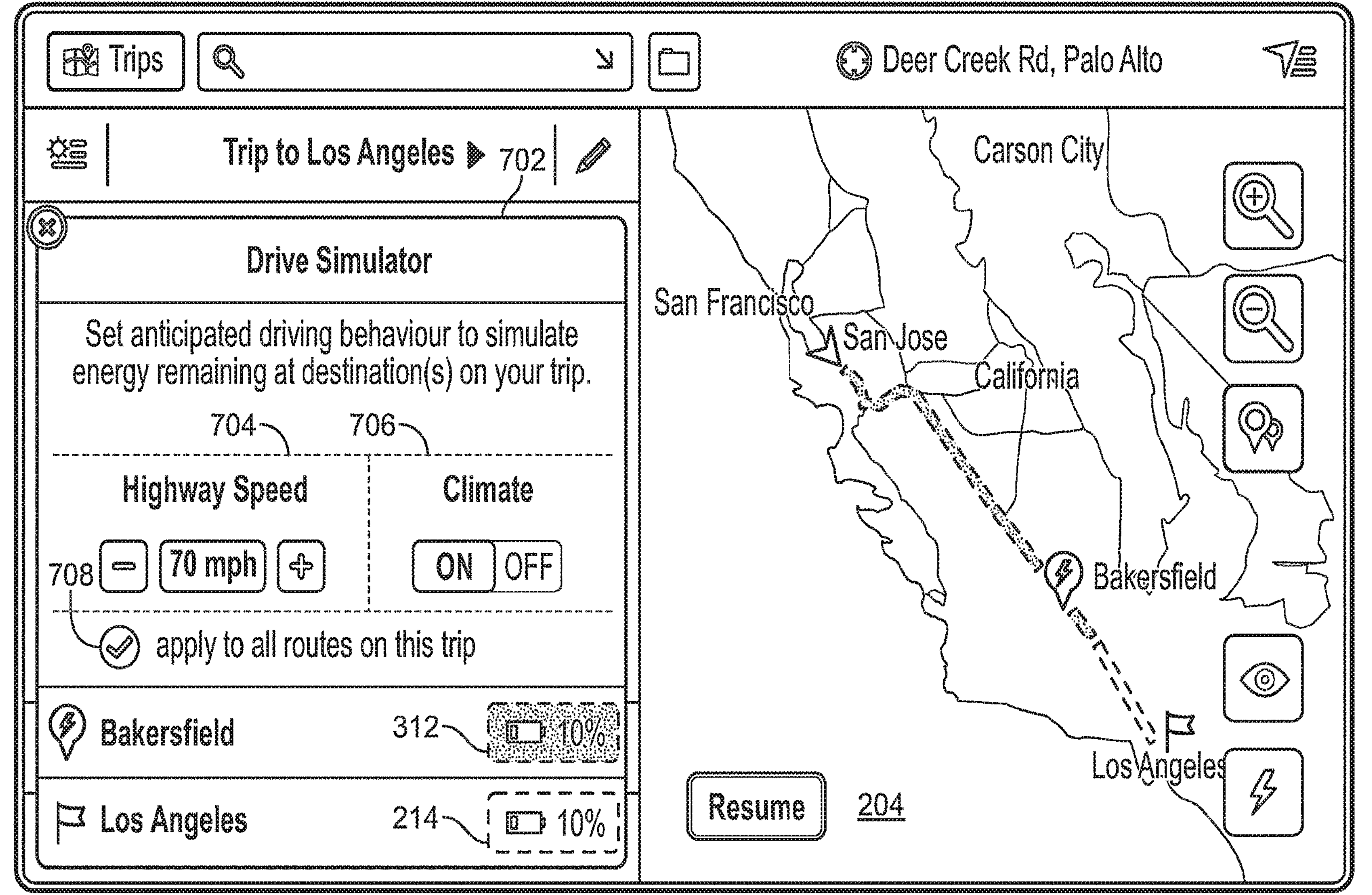
Figure 7C:
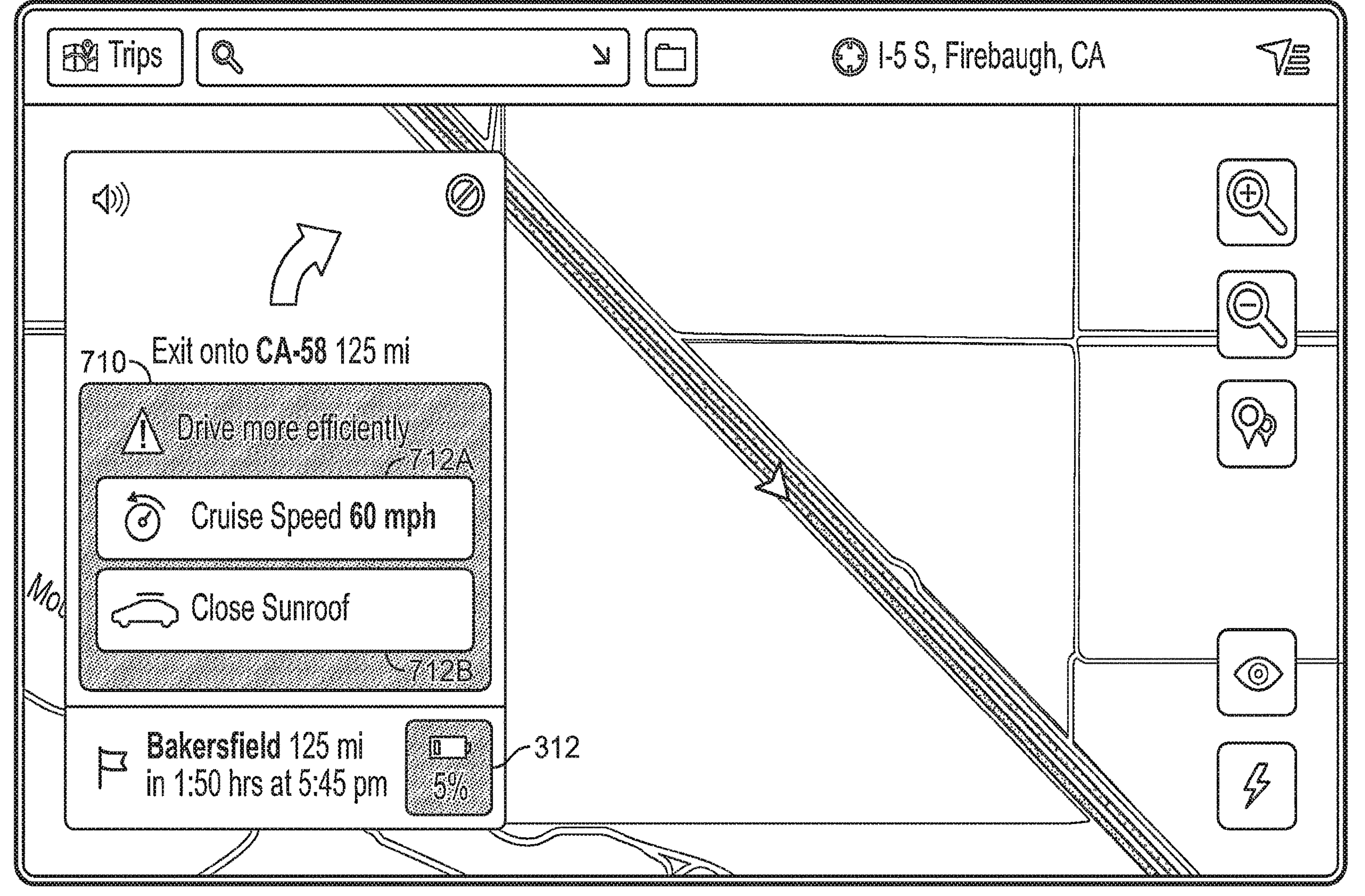

FIGS. 7A-C show an example of using a drive simulator. The system can provide a drive simulator control 700, for example in the trip information area 220 of the user interface 200 as shown in FIG. 7A The drive simulator allows the driver to explore how current energy estimates would be affected by one or more changes in driving behavior or vehicle settings. Currently, the energy values are as follows: according to energy indicator 312, the vehicle is expected to have 20% energy remaining when arriving at the charging waypoint, and according to the energy indicator 214, the vehicle is expected to have 10% energy remaining when arriving at the destination.

Upon the driver actuating the drive simulator control 700, the drive simulator can be initiated, for example as illustrated in FIG. 7B. Here, a drive simulator area 702 is presented that includes a speed simulator 704 and a climate control simulator 706. Beginning with the speed simulator, it allows the driver to evaluate how the predicted level of charge will change if the driver chooses a speed higher or lower than an expected standard style of driving. For example, assume that the default driving speed used by the system is 65 mph for a particular route segment, and that the driver chooses to enter a greater speed (here 70 mph) using the speed simulator 704. In other words, this can be thought of as the driver asking the system: In terms of energy consumption, what if I drive 70 mph on this route segment instead of the 65 mph expected by the system? A control 708 allows the driver to specify whether the what-if scenario should be applied to all routes on the trip, or only to the current route segment. Here, the control has been activated to apply the what-if scenario trip wide.

In response to the driver's input, the system performs the energy calculation using the driver's what-if scenario-that is, using the entered 70-mph value. As a result, the system updates the energy indicator 312 to reflect 10% energy predicted to remain at Bakersfield. That is, the driver can see that this driving style (i.e., higher speed) will cause the battery (or fuel) level to go down to the 10% level, rather than the 20% that had been predicted before the what-if scenario. The energy remaining at the destination-shown by the energy indicator 214—is not predicted to change in this what-if scenario. The reason is that the system can increase the recommended charging amount for Bakersfield to compensate for this hypothetical change in driving behavior. That is, the system would then instruct the driver to add more than the 31 kWh that was the prediction before the what-if scenario. Accordingly, the remaining energy at the destination continues to be 10% also in the what-if scenario.

The energy indicators 214 and 312 are both highlighted to remind the driver that the screen is showing a simulation and not actual values. For example, the highlighting can include providing a dashed outline. The route elements in the map area 204 can be highlighted in a similar way. Other than such highlighting (e.g., the dashes) the route elements can retain their previous color/shade/pattern (e.g., green color, or green outline) to the extent the highlighting remains valid in the what-if scenario. Suppose that green color indicates more than a threshold energy remaining. Then the route element would continue to be colored green in the what-if scenario provided that the simulated change does not bring the vehicle below the threshold on that part of the route.

In the above example, the speed is set as an absolute numerical value (e.g., 70 mph). In some implementations, the driver can enter information in another way. For example, the driver can set the speed by entering a delta value (e.g., 5 mph above or below the system's anticipated speed). Such a setting can be applied also when the route contains segments of different expected driver speed (e.g., both a 65-mph segment and a 55-mph segment). As another example, the speed can be entered as a percentage (e.g., 10% above or below the system's anticipated speed).

Regarding the climate control simulator 706, assume that its default setting is "on," and that the driver changes it to "off" instead as part of the what-if simulation. The system would then take this into account in the energy calculation (together with any other what-if scenario that also may be active) and present the result in an analogous way. For example, turning off climate control is expected to save some amount of battery energy and the predicted levels may then increase instead.

Whether or not the driver has run any what-if scenario in the system (indeed, whether the particular implementation offers that ability or not), the system can provide recommendations to the driver, for example as illustrated in FIG. 7C. For example, assume that the indicator 312 for the Bakersfield charging waypoint currently reads 5%. This would mean that the value has decreased from the earlier predicted level (see, e.g., FIG. 7A) during driving.

A change in a predicted value can be considered an error in the energy prediction, in that the current energy level is lower (or higher) than expected, leading to the reduced (or increased) prediction further along the route. Upon detecting a prediction error, the system can present a recommendation area 710 to the driver. Here, a recommendation 712A encourages the driver to drive more efficiently (i.e., set the cruise speed to 60 mph) and a recommendation 712B suggests that the driver close the sunroof.

In some implementations, at least one of the recommendations 712A-B can also be (or include) a control to effectuate the same recommendation. For example, the driver can click the recommendation 712B to trigger the vehicle's control system to close the sunroof. Of course, the driver could instead effectuate any such recommendation in the regular way the change is made-by driving slower, closing the sunroof or turning off the climate control, to name just a few examples.

Figure 8A:
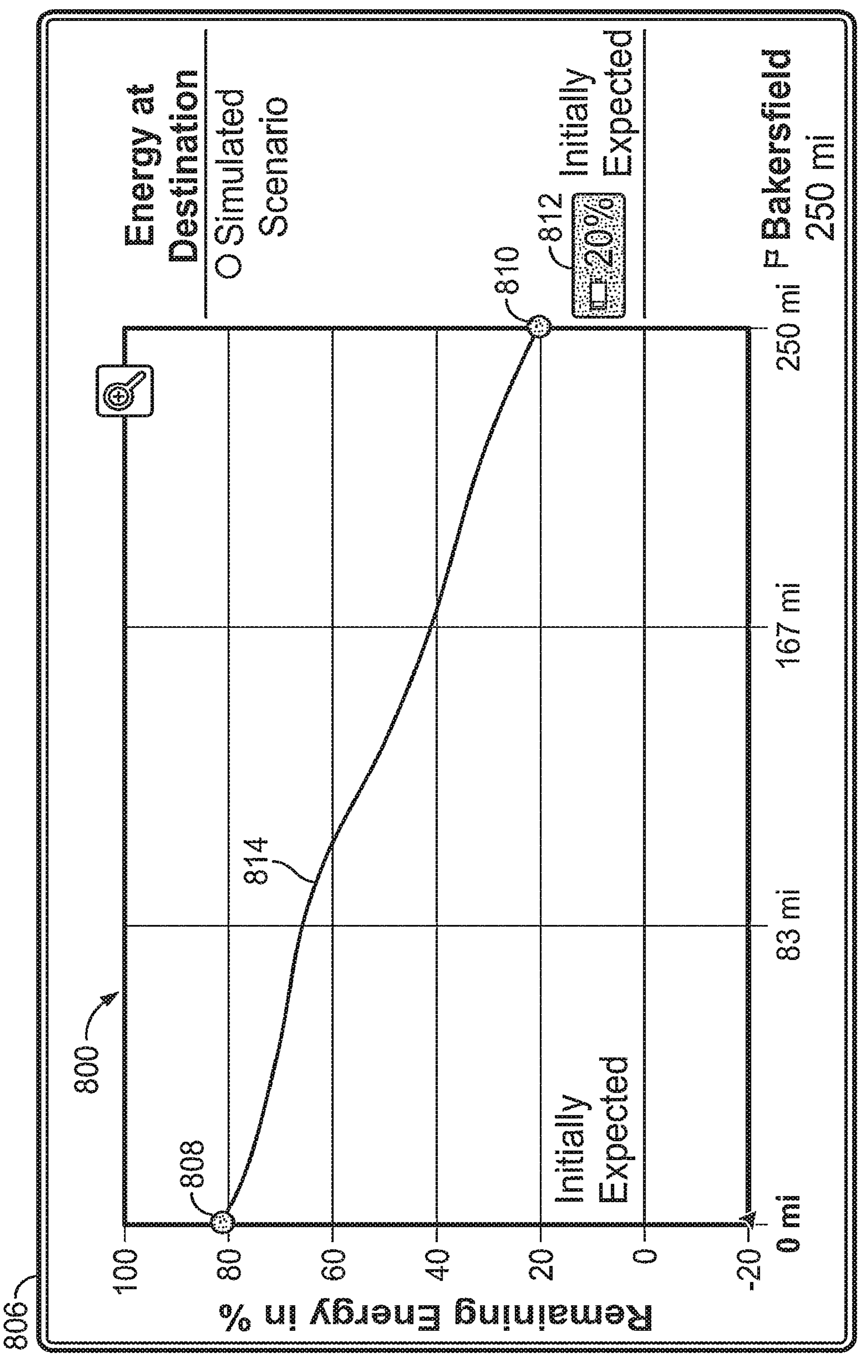
FIGS. 8A-C show examples of an initial prediction, a dynamic prediction and a "what if" simulation being presented.
Figure 8B:
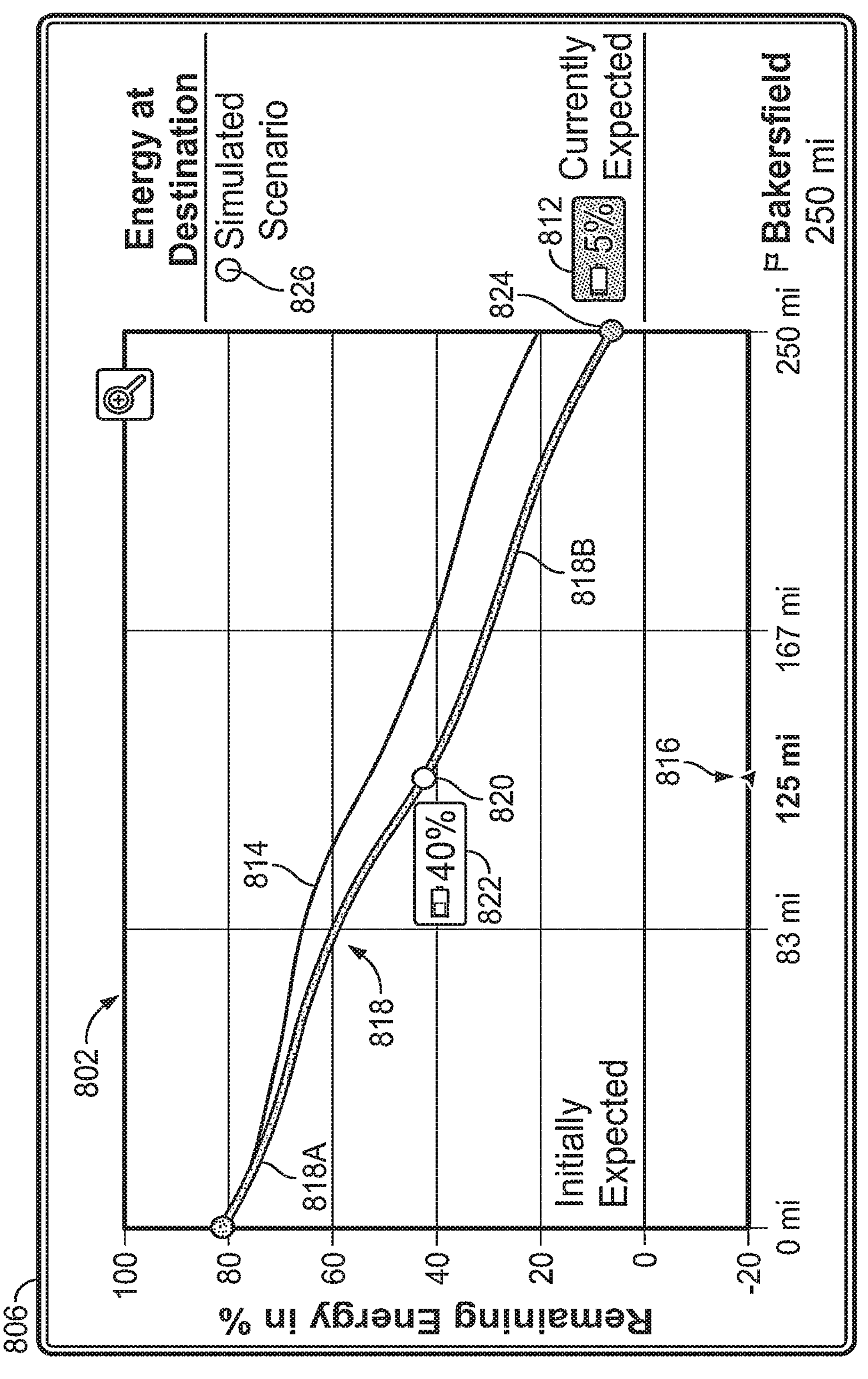
Figure 8C:
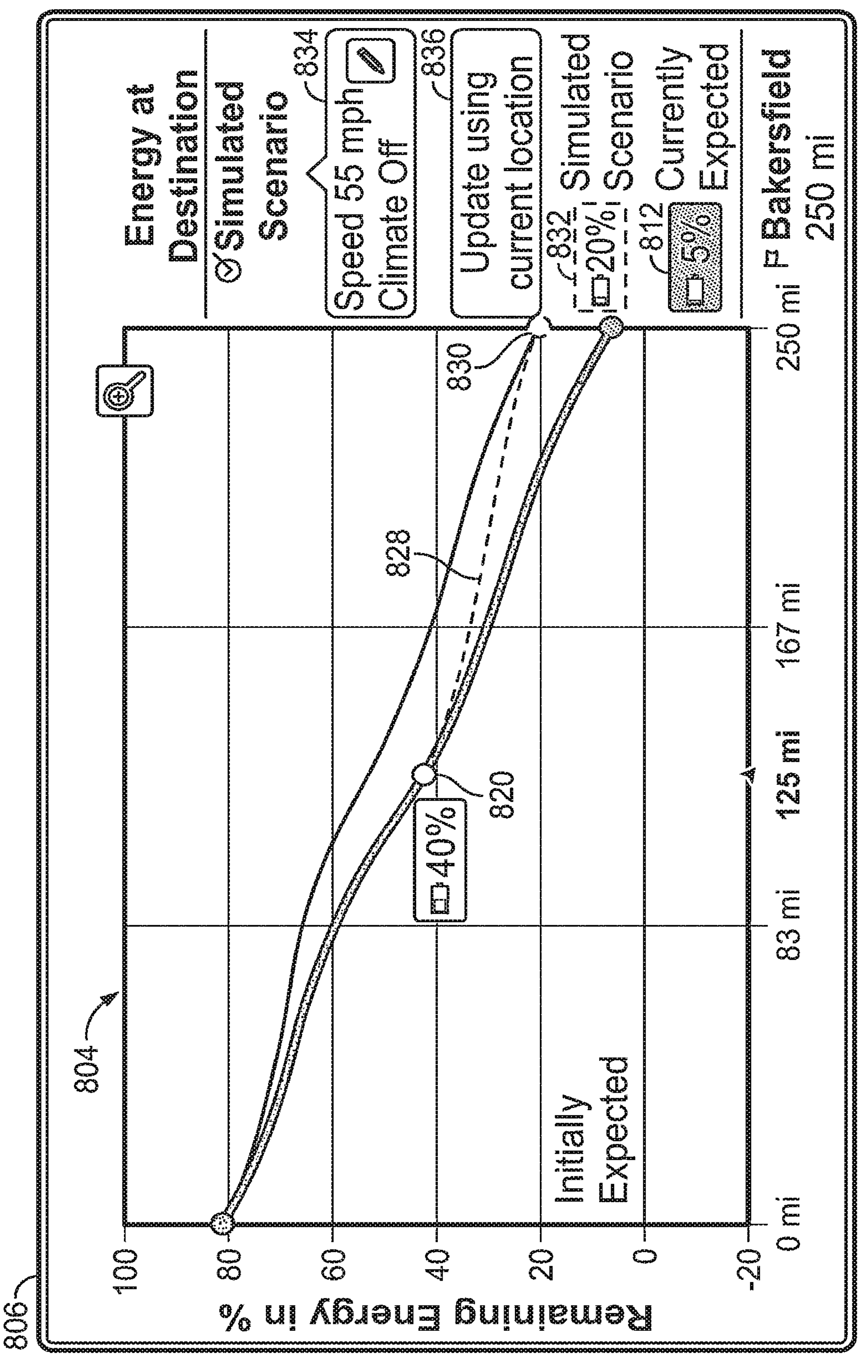

FIGS. 8A-C show an example where the system presents: an initial prediction 800, a dynamic prediction 802 during the drive, and a "what if" scenario 804 based on user input. Each of such views can be presented on a display 806, such as on an auxiliary navigation device (e.g., a GPS unit) or on a native display of the vehicle.

The predictions 800, 802 and 804 all make use of a coordinate system that plots energy as a function of distance or time. Here, for example, the remaining energy as a percentage is measured against the vertical axis, and the trip distance is measured against the horizontal axis.

Other ways of visually presenting a predicted energy level as a function of distance (or time) can be used.

The coordinate system contains a start value 808 and an end value 810. The start value corresponds to the amount of energy available in the vehicle when the trip begins (e.g., the state of charge in an electric vehicle, in this example about 80%), and the end value corresponds to the amount of energy currently predicted to be remaining at the end of the trip. Here, this value is 20%, which is also reflected by an energy indicator 812. In a sense, the trip is predicted to run "from" the start value "to" the end value along a path 814. That is, the path 814 is currently a prediction based on the available model, and the energy-consumption path that the vehicle will actually follow when the trip is taken can differ from the path 814 (e.g., due to model error and/or driver error). The path 814 is an example of an energy-versus-distance measure.

The initial calculation of expected remaining energy (i.e., as reflected in the end value 810 and the energy indicator 812) can take into account a number of types of information. In some implementations, the following can be used:

Road segment definitions (e.g., latitude/longitude specifications) Required segment data (e.g., type of road, speed limits)

Traffic information (e.g., real-time information on traffic speeds) Elevation profiles (segment slopes)

Parameterized energy consumption equations

Vehicle parameters (e.g., coefficient of aerodynamic drag, tire rolling resistance, or vehicle mass)

A limit on the vehicle's power regeneration ("regen") if applicable Drivetrain efficiency (e.g., derived from empirical data)

Headwind, crosswind calculations (e.g., based on current data obtained from NOAA or another source of weather data)

- Crosswind effect on coefficient of drag (e.g., as determined for the particular vehicle model aerodynamics, vehicle speed and direction, and wind speed and direction)
- Air density calculation (e.g., using current meteorological data)
- Cabin consumption calculation (e.g., using empirically derived cabin consumption models)
- Predicted internal battery loss calculation (e.g., based on DC energy consumption of a vehicle)

The parameterized energy consumption equations take into account certain characteristics of the segment and the vehicle. In some implementations, an average road load power for a particular segment can be calculated using road load equations. For example, the road load equations can take into account drive parameters obtained from a fleet of vehicles, the parameters including, but not limited to, a velocity ratio (e.g., predicted root mean squared speed divided by predicted average speed), a predicted average positive acceleration (e.g., vehicle specific or fleet based), and a regen parameter (e.g., a percent recovered of total recoverable energy).

Weather at each point on the route can be interpolated from a gridded weather cube, or from weather at discrete locations along the predicted route. In some implementations, the weather can be a gridded function of latitude, longitude and time. For example, air density can be a function of ambient temperature, relative humidity and elevation. Ambient earth surface temperature and relative humidity are functions of latitude, longitude, and time.

A regen power limit can be applied. In some implementations, when the expected regen torque is outside the regen torque limit, the remaining power can be dissipated in the brakes. For example, the regen torque limit can be a function of average speed and can be provided in form of a lookup table. The torque limit can be saturated by the predicted available battery charge power (e.g. if the battery is full it cannot accept any more energy and the regen torque limit is saturated to zero).

Internal battery losses can be a function of energy weighted power out of the battery over the entire trip. In some implementations, given an energy weighted average discharge power an expected output energy available can be determined. For example, such calculation can be performed by a battery management system in the vehicle.

Dynamic predictions are performed at one or more points during the trip. In some implementations, the calculations are performed essentially on a continuous basis. When a new prediction is performed, the coordinate system can be updated to inform the driver of the current status. For example, the energy indicator 812 can be updated.

FIG. 8B shows an example of presenting a dynamic prediction during the drive. Here, the vehicle is currently at a position 816 along the horizontal axis of the coordinate system, which corresponds to the vehicle having travelled 125 miles, or about half of the planned trip. The initially predicted path 814 has now been complemented by another path 818 having a thicker line. A value 820 on the path 818 reflects the vehicle's currently remaining energy level (i.e., 40%), which is also shown by an energy indicator 822. The value 820 is at a lower energy level in the coordinate system than the corresponding point on the path 814. That is, the vehicle currently has less energy remaining than what it was initially predicted to have at this mileage along the route. The path 818 is an example of an energy-versus-distance measure.

The path 818 has an actual component 818A and a predicted component 818B. The actual component reflects the vehicle's actual energy status during the trip so far (i.e., from the start value to the value 820). The predicted component reflects the dynamically updated estimation for the rest of the trip, taking into account the actual energy values so far. That is, based on the dynamic calculation a new end value 824 has now been determined, which represents a downward adjustment (to 5% remaining energy), compared to the previously predicted end value. This dynamically calculated end value is also shown by the indicator 812.

The discrepancy between the two paths 818 and 814 can be considered a prediction error, and as mentioned earlier such error can be viewed as consisting of two parts: a model error and a driver error. The model error corresponds to a deficiency in modeling the vehicle's energy consumption (and would have occurred even if the driver had been driving exactly as the prediction assumed). The driver error, on the other hand, corresponds to a deficiency in predicting the driver's actual velocity on the trip, for example in that the vehicle was driven slower or faster than expected, and/or accelerated differently. Moreover, the gap between the paths 818 and 814 is here expected to increase over the remainder of the trip, proportional to the model error and driver error.

At some point in the trip the driver may wish to take some action to ensure that the vehicle does not run too low on energy. The system therefore provides a control 826 by which the driver can evaluate a simulated scenario, sometimes referred to as a what-if scenario.

Activating the control 826 can provide one or more input functions for the driver to explore the effects of different driving parameters. The drive simulator area 702 (FIG. 7B) shows some examples in this regard. In some implementations, the driver can specify that the vehicle will be driven at a lower speed for the rest of the trip. For instance, the vehicle may until now have been driven above the estimated driver speed (i.e., around 75 mph instead of 65 mph) and with climate control activated.

Assume now that the driver activates the what-if scenario. Particularly, the driver specifies 55 mph as the driving style for the remaining miles, and that climate control will be turned off Based on the driver's entered information, the prediction is recalculated and the what-if scenario is presented.

FIG. 8C shows an example of a simulation path 828 that is provided in such a what-if scenario. The simulation path runs from the value 820 (where the what-if scenario was calculated) to a simulated end point 830. A simulation energy indicator 832 shows that the battery is predicted to have 20% energy remaining at the destination. The simulation path and the simulation energy indicator have dashed outlines to indicate that they are simulations. An area 834 informs the driver that the what-if scenario involves keeping the vehicle speed at 55 mph and turning off climate control. The simulation path 828 is an example of an energy-versus-distance measure.

The what-if scenario is determined using a forward looking model that is recalculated from the vehicle's current location (at 125 miles in this example) and using the currently remaining energy (40% in this example). Importantly, the forward looking model assumes that the driver error is zero (i.e., that the driver will behave as indicated in the inputs of the what-if scenario). For example, the what-if scenario can be determined as follows:

$$E_{simulated}=E_{predicted}(\bar{v}_{user},\text{cabin}_{user})\cdot(1+\text{Wmodel}\cdot\text{Model Error})$$

wherein $E_{simulated}$ is the remaining energy predicted according to the what-if scenario $E_{predicted}$ is the function that predicts remaining energy based on particular settings (e.g., average vehicle speed and cabin equipment)

$\bar{v}_{user}$ is the average speed that the user enters in the what-if scenario $cabin_{user}$ is the climate control setting that the user enters in the what-if scenario $W_{model}$ is the weight applied to the model error (e.g., a factor between zero and one)

Model Error is the model error that together with the driver error makes up the total prediction error at the point of calculating the what-if scenario (here at the position 518)

That is, in determining the predicted remaining energy according to the what-if scenario the driver's entered speed information and cabin setting are taken into account in the function $E_{predicted}$ By contrast, the expected energy reflected by the indicator 812 (i.e., that does not reflect a what-if scenario), takes into account both the model error and the driver error, for example as follows:

$$E_{expected}=E_{predicted}(\bar{v},\text{cabin On})\cdot(1+w_{model}\cdot\text{Model Error}+w_{driver}\cdot\text{Driver Error})$$

wherein $\bar{v}$ is the average speed of the vehicle assumed in the model cabin On indicates that the model assumes the climate control system to be operating $w_{driver}$ is the weight applied to the driver error (e.g., a factor between zero and one)

Driver Error is the driver error that together with the model error makes up the total prediction error That is, in determining the predicted remaining energy without any what-if scenario the model's assumed average speed and cabin setting are taken into account in the function $E_{predicted}$.

Referring again to FIG. 8C, the system can provide a control 836 for updating the what-if scenario calculation based on the vehicle's current location. For instance, in the above example the control 836 can be activated later in the trip and the screen is then updated with information calculated using the parameters and values that then characterize the vehicle and the remainder of the trip. As another example, the system can essentially continuously update the what-if scenario.

In some implementations, vehicles may engage in substantial reporting of data back to the manufacturer or to another entity. For example, the vehicle may have communication equipment that allows the vehicle to constantly or regularly report various data to a remote location, and such data can then be used for diagnostics, service, customer relations management, or other purposes. The privacy of the vehicle's owner and other related persons (e.g., passengers), and of data attributable or relating to them, is protected as required by applicable laws, regulations, ordinances, other rules, and/or contractual agreements with the vehicle owner.

Another aspect will now be described that relates to providing the driver a level of comfort that the vehicle will not run out of energy. An electric vehicle will be used as illustration in the following description. In some implementations, the electric vehicle is configured to alert the driver if and when the driver is traveling too far from the nearest charging station. In a sense this can be considered as providing the driver assurance that the vehicle will not run out of range, or range assurance for short. As an example, some features of the system I 00 (FIG. 1) can be used. Range assurance can be provided during navigation (e.g., FIGS. 3A through 8C) and/or when the vehicle is being driven without navigation.

When the vehicle is being driven, the vehicle system monitors relevant information and performs calculations regarding the level of available energy and options available to the driver. In some implementations, any or all information taken into account by the operation 112 (calculate energy required) can be taken into account, such as information from the data sources 113. For example, the car's location and a state-of-charge (SOC) of the electric energy storage (e.g., a battery pack) can be determined. Another calculation performed is to define an infeasibility radius with regard to the car. That is, the radius is defined based on the known information about SOC, position, etc., so that it is infeasible for the vehicle to drive to anything beyond a circle defined by that radius, unless recharging is done along the way. Any location inside the circle, on the other hand, is potentially-but not necessarily with certainty-reachable under the present circumstances.

The calculated circle narrows down a set of charging stations to a subset, namely the charging stations located within the circle. This narrowing is done from a list of charging stations to which the vehicle has access. In some implementations, the operation 124 (generate list of verified charging options) can perform this task using source 126 of charging stations. For example, a list of all known chargers (e.g., Tesla Motors superchargers and destination chargers), as well as chargers that the vehicle has visited in the past, can be stored in the vehicle and used as the source of this information.

The subset of charging stations is monitored in real time. From time to time (e.g., on the order of once a minute or more often) the system evaluates the charging stations on the list. In some implementations, an energy calculation is performed for each station in the subset. For example, with each charging station it can be evaluated how much energy it would take for the vehicle to drive from its current location (i.e., when the evaluation is done) to that charging station. As long as at least one of the charging stations in the subset can be reached based on the present conditions and circumstances, the system does not make any special output or otherwise alert the driver that these calculations are being performed. That is, the driver can be unaware that range assurance is being performed in the background.

The determination whether the vehicle can reach the given charging station can take into account a threshold SOC. For example, the operation 112 (calculate energy required) can estimate that when the vehicle reaches the charging station it would have a certain amount of energy in storage (corresponding to a particular SOC). If that particular SOC is at least equal to a predefined minimum SOC for these evaluations then the charging station is deemed reachable. The amount of remaining energy can be represented by any suitable measure, including, but not limited to, the available range. For example, it is determined whether the vehicle can arrive at a given charging station and still have at least a minimum amount of range (as determined by the vehicle's battery management system) available in storage. In some implementations, the user can set the threshold for this calculation. For example, a preferences menu (e.g., the area 600 in FIG. 6A) can provide a control for making this setting. Any suitable form of input control can be used, including, but not limited to, a slider.

As part of the continuous or regular monitoring of the charging stations in the subset, any station that becomes unreachable is excluded from the subset. That is, although that particular station was once reachable, it can no longer be reached based on location and energy level, and is therefore removed. All the while, new charging stations can be entered into the subset as the vehicle travels.

As mentioned earlier, as long as at least one charging station remains in the subset, the range assurance operations can be unnoticeable to the driver. If the subset becomes empty, on the other hand, an alert can be generated. For example, a visual cue can be presented (e.g., in the user interface 200 of FIGS. 2A through 8C) recommending the driver to charge the vehicle. The system can prompt the driver one or more times regarding the discovered energy situation and can require an affirmative input each time.

In some implementations, when alerting the driver as above, the system can make a specific recommendation for the best charger to use and how long to charge at that location, such as along the lines of instructions 412 (FIG. 4D). Such recommendation can favor some charging stations (e.g., a faster ones) over others.

Other information can be presented when the subset of charging stations becomes empty, and optionally at other times as well. For example, the system can indicate the locations of reachable charging stations to choose between. As another example, the system can make one or more suggestions along the lines of recommendations 712A-B (FIG. 7C).

Real-time information relating to charging stations can be taken into account. In some implementations, information such as the options 404A-C and/or the box 406 (FIG. 4C) can be presented. For example, regarding each charging station the driver can be informed about relevant traffic congestion, a fill level provided by the station, and/or an availability of the station and its chargers.

The determination of whether the vehicle can reach any given charging station can take into account any of multiple types of information. For example, road distance, elevation change, weather data and/or actual highway driving speeds can be considered. In some implementations, one or more road load equations used for energy calculation by the operation 112 can be used. For example, any or all of the types of information listed in the description above of FIG. 8 can be used.

A number of implementations have been described as examples. Nevertheless, other implementations are covered by the following claims.

What is claimed is:

1. A method comprising:

presenting a first energy-versus-distance measure on a graphical user interface associated with a vehicle, the first energy-versus-distance measure being associated with a planned driving route of the vehicle, the first energy-versus-distance measure being based on an energy model;

determining, based on information associated with an already-driven part of the planned driving route, one or more errors associated with the energy model; and based on receipt of user input to the graphical user interface, presenting via the graphical user interface:

first information indicative of energy storage of the vehicle as a function of distance, the first information being based on the first energy-versus-distance measure, and the first information mapping distance along the planned driving route to energy storage of the vehicle, and second information associated with the one or more errors, the second information indicative of energy storage of the vehicle as a function of distance along the already-driven part, wherein the second information includes a first portion associated with the already-driven part and a second portion associated with a remaining part of the planned driving route, the remaining part being determined based on the one or more errors, wherein the first information and the second information are presented together via the graphical user interface as overlaid paths on a common graph plotting energy storage versus distance along the planned driving route, and wherein the graphical user interface is responsive to user input associated with simulating adjustments associated with the remaining part of the planned driving route.

2. The method of claim 1, wherein the one or more errors are associated with driving characteristics.

3. The method of claim 2, wherein the driving characteristics are associated with a fleet of vehicles.

4. The method of claim 2, wherein the driving characteristics are associated with a driver of the vehicle.

5. The method of claim 1, wherein the graphical user interface includes information associated with recommendations associated with reducing energy consumption.

6. A system comprising one or more processors and non-transitory computer storage media storing instructions that when executed by the one or more processors, cause the one or more processors to perform operations comprising:

presenting a first energy-versus-distance measure on a graphical user interface associated with a vehicle, the first energy-versus-distance measure being associated with a planned driving route of the vehicle, the first energy-versus-distance measure being based on an energy model;

determining, based on information associated with an already-driven part of the planned driving route, one or more errors associated with the energy model; and based on receipt of user input to the graphical user interface, presenting via the graphical user interface:

first information indicative of energy storage of the vehicle as a function of distance, the first information being based on the first energy-versus-distance measure, and the first information mapping distance along the planned driving route to energy storage of the vehicle, and second information associated with the one or more errors, the second information indicative of energy storage of the vehicle as a function of distance along the already-driven part, wherein the second information includes a first portion associated with the already-driven part and a second portion associated with a remaining part of the planned driving route, the remaining part being determined based on the one or more errors, wherein the first information and the second information are presented together via the graphical user interface as overlaid paths on a common graph plotting energy storage versus distance along the planned driving route, and wherein the graphical user interface is responsive to user input associated with simulating adjustments associated with the remaining part of the planned driving route.

7. The system of claim 6, wherein the one or more errors are associated with driving characteristics.

8. The system of claim 7, wherein the driving characteristics are associated with a fleet of vehicles.

9. The system of claim 7, wherein the driving characteristics are associated with a driver of the vehicle.

10. The system of claim 6, wherein the graphical user interface includes information associated with recommendations associated with reducing energy consumption.

11. Non-transitory computer storage media storing instructions that when executed by a system of one or more processors, cause the one or more processors to perform operations comprising:

presenting a first energy-versus-distance measure on a graphical user interface associated with a vehicle, the first energy-versus-distance measure being associated with a planned driving route of the vehicle, the first energy-versus-distance measure being based on an energy model;

determining, based on information associated with an already-driven part of the planned driving route, one or more errors associated with the energy model; and based on receipt of user input to the graphical user interface, presenting via the graphical user interface:

first information indicative of energy storage of the vehicle as a function of distance, the first information being based on the first energy-versus-distance measure, and the first information mapping distance along the planned driving route to energy storage of the vehicle, and second information associated with the one or more errors, the second information indicative of energy storage of the vehicle as a function of distance along the already-driven part, wherein the second information includes a first portion associated with the already-driven part and a second portion associated with a remaining part of the planned driving route, the remaining part being determined based on the one or more errors, wherein the first information and the second information are presented together via the graphical user interface as overlaid paths on a common graph plotting energy storage versus distance along the planned driving route, and wherein the graphical user interface is responsive to user input associated with simulating adjustments associated with the remaining part of the planned driving route.

12. The computer storage media of claim 11, wherein the one or more errors are associated with driving characteristics or wherein the driving characteristics are associated with a fleet of vehicles.

13. The computer storage media of claim 12, wherein the driving characteristics are associated with a driver of the vehicle.

14. The computer storage media of claim 11, wherein the graphical user interface includes information associated with recommendations associated with reducing energy consumption.

15. The method of claim 1, wherein the adjustments include adjustments to driving characteristics.

* * * * *